US008149368B2

(12) United States Patent
Yoo et al.

(10) Patent No.: US 8,149,368 B2
(45) Date of Patent: Apr. 3, 2012

(54) IN-PLANE SWITCHING LCD PANEL

(75) Inventors: Jang-Jin Yoo, Seoul (KR); Hyung-Ki Hong, Seoul (KR); Yun-Bok Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/385,311

(22) Filed: Apr. 3, 2009

(65) Prior Publication Data

US 2009/0231531 A1 Sep. 17, 2009

Related U.S. Application Data

(62) Division of application No. 11/399,527, filed on Apr. 7, 2006, now Pat. No. 7,528,919, which is a division of application No. 10/620,575, filed on Jul. 17, 2003, now Pat. No. 7,057,696, which is a division of application No. 09/836,352, filed on Apr. 18, 2001, now Pat. No. 6,636,289.

(30) Foreign Application Priority Data

Apr. 19, 2000 (KR) ................................ 2000-20722
Aug. 8, 2000 (KR) ................................ 2000-45988

(51) Int. Cl.
*G02F 1/1343* (2006.01)
(52) U.S. Cl. ....................................................... 349/141
(58) Field of Classification Search .................. None
See application file for complete search history.

(56) References Cited

U.S. PATENT DOCUMENTS

| 5,946,066 | A | 8/1999 | Lee et al. | |
|---|---|---|---|---|
| 5,977,562 | A | 11/1999 | Hirakata et al. | 257/72 |
| 5,995,186 | A | 11/1999 | Hiroshi | |
| 6,052,168 | A | 4/2000 | Nishida et al. | 349/141 |
| 6,088,078 | A | 7/2000 | Kim et al. | |
| 6,097,463 | A | 8/2000 | Chen | 349/130 |
| 6,128,061 | A * | 10/2000 | Lee et al. | 349/141 |
| 6,154,266 | A | 11/2000 | Okamoto et al. | 349/129 |
| 6,266,118 | B1 | 7/2001 | Lee et al. | 349/141 |
| 6,317,183 | B2 | 11/2001 | Komatsu | |
| 6,323,927 | B1 | 11/2001 | Hiroshi | |

(Continued)

FOREIGN PATENT DOCUMENTS

JP 04-194823 7/1992

(Continued)

*Primary Examiner* — Timothy L Rude
(74) *Attorney, Agent, or Firm* — McKenna Long & Aldridge, LLP

(57) ABSTRACT

The present invention discloses an array substrate for an IPS-LCD device. The IPS-LCD device according to the present invention implements a multi-domain for a liquid crystal layer. The liquid crystal molecules are aligned in various directions with respect to each different domain. Therefore, the different domains compensate for one another such that a color shift is prevented in spite of wide viewing angles. To form the multi-domain, the present invention provides an array substrate having divided common electrode or pixel electrode or both. In another aspect, to form the multi-domain, the present invention provides an array substrate having multi-bar shaped common and pixel electrodes. Each of the common and pixel electrodes has a transverse portion and a perpendicular portion. The transverse portions of the common and pixel electrodes induce a first domain, whereas the perpendicular portions of the common and pixel electrodes induce a second domain.

2 Claims, 23 Drawing Sheets

U.S. PATENT DOCUMENTS

| | | | |
|---|---|---|---|
| 6,335,770 B1 | 1/2002 | Komatsu | 349/38 |
| 6,452,657 B1 * | 9/2002 | Suzuki et al. | 349/141 |
| 6,642,984 B1 * | 11/2003 | Yoshida et al. | 349/139 |
| 6,657,693 B1 * | 12/2003 | Jeong et al. | 349/141 |
| 6,803,979 B2 | 10/2004 | Yoo et al. | 349/84 |
| 7,030,954 B2 | 4/2006 | Yoo et al. | 349/141 |

FOREIGN PATENT DOCUMENTS

| | | |
|---|---|---|
| KR | 1997-0071059 | 11/1997 |
| KR | P1999-017651 | 3/1999 |

* cited by examiner

IN-PLANE SWITCHING LCD PANEL

CROSS-REFERENCE TO RELATED APPLICATIONS

This application is a divisional of U.S. patent application Ser. No. 11/399,527, filed Apr. 7, 2006, now U.S. Pat. No. 7,528,919 now allowed, which is a divisional application of U.S. patent application Ser. No. 10/620,575, filed Jul. 17, 2003, now U.S. Pat. No. 7,057,696 which is a divisional of U.S. patent application Ser. No. 09/836,352, now U.S. Pat. No. 6,636,289, filed Apr. 18, 2001, which claims priority to Korean Patent Application Nos. 2000-20722 filed Apr. 19, 2000 and 2000-45988 filed Aug. 8, 2000, all of which are incorporated by reference for all purposes as if fully set forth herein.

BACKGROUND OF THE INVENTION

1. Field of the Invention

The present invention relates to a liquid crystal display device, and more particularly to a liquid crystal display device implementing in-plane switching (IPS) where an electric field to be applied to liquid crystal is generated in a plane parallel to a substrate.

2. Discussion of the Related Art

A typical liquid crystal display (LCD) device uses optical anisotropy and polarization properties of liquid crystal molecules. The liquid crystal molecules have a definite orientational order in alignment resulting from their thin and long shapes. The alignment orientation of the liquid crystal molecules can be controlled by supplying an electric field to the liquid crystal molecules. In other words, as the alignment direction of the electric field is changed, the alignment of the liquid crystal molecules also changes. Because incident light is refracted to the orientation of the liquid crystal molecules due to the optical anisotropy of the aligned liquid crystal molecules, image data is displayed.

A liquid crystal is classified into a positive liquid crystal and a negative liquid crystal, in view of electrical property. The positive liquid crystal has a positive dielectric anisotropy such that long axes of liquid crystal molecules are aligned parallel to an electric field. Whereas, the negative liquid crystal has a negative dielectric anisotropy such that long axes of liquid crystal molecules are aligned perpendicular to an electric field.

By now, an active matrix LCD that the thin film transistors and the pixel electrodes are arranged in the form of a matrix is most attention-getting due to its high resolution and superiority in displaying moving video data.

FIG. 1 is a cross-sectional view illustrating a typical twisted nematic (TN) LCD panel. As shown in FIG. 1, the TN-LCD panel has lower and upper substrates 2 and 4 and an interposed liquid crystal layer 10. The lower substrate 2 includes a first transparent substrate 1a and a thin film transistor ("TFT") "S". The TFT "S" is used as a switching element to change orientation of the liquid crystal molecules. The lower substrate 2 further includes a pixel electrode 15 that applies an electric field to the liquid crystal layer 10 in accordance with signals applied by the TFT "S". The upper substrate 4 has a second transparent substrate 1b, a color filter 8 on the second transparent substrate 4, and a common electrode 14 on the color filter 8. The color filter 8 implements color for the LCD panel. The common electrode 14 serves as another electrode for applying a voltage to the liquid crystal layer 10. The pixel electrode 15 is arranged over a pixel portion "P," i.e., a display area. Further, to prevent leakage of the liquid crystal layer 10 between the lower and upper substrates 2 and 4, those substrates are sealed by a sealant 6.

As described above, because the pixel and common electrodes 15 and 14 of the conventional TN-LCD panel are positioned on the lower and upper substrates 2 and 4, respectively, the electric field induced therebetween is perpendicular to the lower and upper substrates 1a and 1b. The above-mentioned liquid crystal display device has advantages of high transmittance and aperture ratio, and further, since the common electrode on the upper substrate serves as an electrical ground, the liquid crystal is protected from a static electricity.

FIGS. 2A and 2B show different alignments of the positive TN liquid crystal molecules 10, respectively, without and with an electric field (off and on states). In FIG. 2A, various arrows show the gradual rotating of the liquid crystal molecules 10 with polar angles 0 to 90 degrees, which are measured on a plane parallel to the lower and upper substrate 2 and 4. At the same time, the liquid crystal molecules 10 are gradually rotated to 90 degrees from the lower substrate 2 to the upper substrate 4. That is to say, the long axes of the liquid crystal molecules 10 gradually rotate along a helical axis (not shown) that is perpendicular to the lower and upper substrates 2 and 4. First and second polarizers 18 and 30 are positioned, respectively, on the exterior surfaces of the lower and upper substrates. Referring to FIG. 2A, the broken lines on the first and second polarizers 18 and 30 correspond to first and second transmittance axis of the first and second polarizers 18 and 30, respectively. After rays of light travel through a TN liquid crystal panel in the off state, as described above, they are linearly polarized and rotated 90 degrees.

As shown in FIG. 2B, when there is an electric field "E" applied to the positive TN liquid crystal molecules 10, the liquid crystal molecules are aligned perpendicular to the upper and lower substrates 4 and 2. That is to say, with the electric field "E" applied across the liquid crystal molecules 10, the liquid crystal molecules 10 rotate to be parallel to the electric field "E". In this case, the rotation of the linearly polarized light does not take place. Therefore, light is blocked by the second polarizers 30 after it travels through the first polarizer 18.

However, the above-mentioned operation mode of the TN-LCD panel has a disadvantage of a narrow viewing angle. That is to say, the TN liquid crystal molecules rotate with polar angles 0 to 90 degrees, which are too wide. Because of the large rotating angle, contrast ratio and brightness of the TN-LCD panel fluctuate rapidly with respect to the viewing angles.

To overcome the above-mentioned problem, an in-plane switching (IPS) LCD panel was developed. The IPS-LCD panel implements a parallel electric field that is parallel to the substrates, which is different from the TN or STN (super twisted nematic) LCD panel. A detailed explanation about operation modes of a typical IPS-LCD panel will be provided with reference to FIGS. 3, 4A, and 4B.

As shown in FIG. 3, first and second substrates 1a and 1b are spaced apart from each other, and a liquid crystal "LC" is interposed therebetween. The first and second substrates 1a and 1b are called an array substrate and a color filter substrate, respectively. Pixel and common electrodes 15 and 14 are disposed on the first substrate 1a. The pixel and common electrodes 15 and 14 are parallel with and spaced apart from each other. On a surface of the second substrate 1b, a color filter 25 is disposed opposing the first substrate 1a. The pixel and common electrodes 15 and 14 apply an electric field "E"

to the liquid crystal "LC". The liquid crystal "LC" has a negative dielectric anisotropy, and thus it is aligned parallel to the electric field "E".

FIGS. 4A and 4B conceptually illustrate operation modes for a typical IPS-LCD device. In an off state, the long axes of the LC molecules "LC" maintain a definite angle with respect to a line that is perpendicular to the pixel and common electrodes 15 and 14. The pixel and common electrode 15 and 14 are parallel with each other. Herein, the angle difference is 45 degrees, for example.

In an on state, an in-plane electric field "E", which is parallel with the surface of the first substrate 1a, is generated between the pixel and common electrodes 15 and 14. The reason is that the pixel electrode 15 and common electrode 14 are formed together on the first substrate 1a. Then, the LC molecules "LC" are twisted such that the long axes thereof coincide with the electric field direction. Thereby, the LC molecules "LC" are aligned such that the long axes thereof are perpendicular to the pixel and common electrodes 15 and 14.

In the above-mentioned IPS-LCD panel, there is no transparent electrode on the color filter, and the liquid crystal used in the IPS-LCD panel includes a negative dielectric anisotropy.

FIGS. 5A and 5B are conceptual plane views illustrating alignment of the liquid crystal molecules of the above-mentioned IPS-LCD panel, respectively, in off and on states. As shown in FIG. 5A, each liquid crystal molecule 10 is aligned in a proper direction by a pair of alignment layers (not shown), which are formed on opposing surfaces of the first and second substrate 1a and 1b. As shown in FIG. 5B, the electric field "E" is applied between the pixel and common electrodes 15 and 14 such that each molecule 10 is aligned in accordance with the electric field "E". That is to say, each liquid crystal molecule 10 rotates to a definite angle in accordance with the electric field "E".

Compared with the TN-LCD device of FIG. 1, the IPS-LCD device has a wider viewing angle owing to a smaller rotating angle of the liquid crystal molecules.

The IPS-LCD device has the advantage of a wide viewing angle. Namely, when a user looks at the IPS-LCD device in a top view, the wide viewing angle of about 70 degrees is achieved in up, down, right and left directions.

By the above-mentioned operation modes and with additional elements such as polarizers and alignment layers, the IPS-LCD device displays images. The IPS-LCD device has a wide viewing angle, low color dispersion qualities, and the fabricating processes thereof are simpler among those of various LCD devices.

However, because the pixel and common electrodes are disposed on the same plane on the lower substrate, the transmittance and aperture ratio are low. In addition, a response time according to a driving voltage should be improved, and a color's dependence on the viewing angle should be decreased.

FIG. 6 is a graph of the CIE (Commission Internationale de l'Eclairage) color coordinates and shows the color dispersion property of the conventional IPS-LCD device. The horseshoe-shaped area is the distribution range of the wavelength of visible light. The results are measured using point (0.313, 0.329) in CIE coordinate as a standard white light source and with various viewing angles of right, left, up and down, and 45 and 135 degrees. Obviously, the range of the color dispersion is so long, which means that the white light emitted from the conventional IPS-LCD device is dispersed largely according to the viewing angle. This results from the fact that the operation mode of the IPS-LCD device is controlled by birefringence. S. Endow et al. indicated the above-mentioned problem in their paper "Advanced 18.1-inch Diagonal Super-TFT-LCDs with Mega Wide Viewing Angle and Fast Response Speed of 20 ms: IDW 99' 187 page".

FIG. 7 is a graph illustrating transmittance with respect to viewing angles for first to eighth gray levels (gray scale) of a conventional IPS-LCD device. Except for the first gray level, "level 1," each gray level has the highest transmittance at a viewing angle of 0 degree. The first gray level, "level 1" has gray inversion regions. When the viewing angle is beyond 60 degrees, the first gray level, "level 1," has the higher transmittance than the fourth gray level, "level 4". The first gray level, "level 1," should implement a black state of the LCD panel. However, gray inversion occurs at viewing angles larger than 60 degrees, such that a white state, but not a black state, is produced at the larger viewing angles. The above-mentioned gray inversion results from a birefringence dependence of the IPS-LCD device and causes poor display quality of the IPS-LCD device.

To achieve the wide viewing angle and an improved color dispersion property, the common and pixel electrodes for the IPS-LCD device are designed to have various shapes. FIG. 8 illustrates a first example of the IPS-LCD device according to a related art. As shown in FIG. 8, a plurality of pixel and common electrode 15 and 14 are alternately arranged on a substrate (reference 1a of FIG. 3) having a thin film transistor "S". At this point, an alignment layer (not shown) is formed on the substrate (not shown). The alignment layer has first and second rubbing directions 40a and 40b, respectively, in accordance with first and second domains "A" and "B" such that a multi-domain for liquid crystal molecules 10 is achieved.

Therefore, the liquid crystal molecules 10 are divided into first and second liquid crystal portions 10a and 10b, which correspond to the first and second domains "A" and "B", respectively. In accordance with the first and second rubbing directions 40a and 40b, the first and second liquid crystal portions 10a and 10b are aligned to have symmetric pretilt angles. The above-mentioned multi-domain has advantages of preventing color filter shift and achieving the wide viewing angle.

FIGS. 9A and 9B, respectively, show expanded views of the first and second domains "A" and "B" of FIG. 8. In the off state, the first and second liquid crystal portions 10a and 10b (broken lines) are aligned in accordance with the first and second rubbing directions 40a and 40b, respectively.

Therefore, the first and second liquid crystal portions 10a and 10b are respectively aligned to have symmetric pretilt angles. Whereas, when an electric field "E" is applied between the pixel and common electrodes 15 and 14, the first and second liquid crystal portions 10a and 10b (continuous lines) are aligned in accordance with the electric field "E". Therefore, the first and second liquid crystal portions 10a and 10b are aligned in the same direction. In other words, a single-domain is present for the on state, or the white state.

The above-mentioned single-domain of the on state causes a narrow viewing angle and a color shift. For example, instead of white, yellow is displayed when a user watches along short axes of the liquid crystal molecules, and blue is displayed when the user watches along long axes of the liquid crystal molecules.

FIG. 10 shows a second example of the IPS-LCD device according to the related art. As shown, zigzag-shaped pixel electrodes 35 and zigzag-shaped common electrodes 34 are alternately arranged such that first and second electric fields 46a and 46b are alternately induced along the zigzag-shaped electrodes. The first and second electric fields 46a and 46b have different directions. Therefore, a multi-domain is achieved owing to the first and second electric fields 46a and 46b. An alignment layer (not shown) is also used for a first state alignment of liquid crystal molecules (reference 10 of FIG. 8). The alignment layer (not shown) beneficially has one rubbing direction 60 instead of the first and second rubbing directions 40a and 40b of FIG. 8. In comparison with the first example shown in FIG. 8, many more domains are produced by the second example.

The above-mentioned zigzag-shaped common and pixel electrodes 34 and 35 minimize the color shift. However, between bending portions "D" of the common and pixel electrodes 34 and 35, an electric field is induced perpendicular to the rubbing direction 44. That is to say, long axes of the liquid crystal molecules are perpendicular to the electric field induced between the bending portions "D". Then, the liquid crystal molecules cannot rotate but keep the first state alignment such that an abnormal alignment is present at each boundary portion "C" between the different domains.

The abnormal alignment at the boundary portion "C" causes a light leak such that white lines are shown on a display area, the pixel region "P" shown in FIG. 1, of the LCD device. The above-mentioned white lines are called a disclination. A black matrix may be expanded to the pixel regions to cover the disclination. However, the expanded black matrix causes a low aperture ratio.

Now, with reference to FIGS. 11A and 11B, effect of the multi-domain is explained in detail. A liquid crystal layer generally has a birefringence, because each liquid crystal molecule has a long and thin shape. The birefringence changes with respect to a viewing angle. FIG. 11A is a cross-sectional view illustrating a single-domain for a liquid crystal molecule 10 between upper and lower polarizers 30 and 18. At this point, the birefringence of the liquid crystal molecule 10 involves different values for the first, second, and third position "a", "b", and "c", which involve different viewing angles. Therefore, the birefringence of the liquid crystal molecule 10 cannot be zero with respect to viewing angles. If the birefringence of the liquid crystal layer is not zero, the perfect black state cannot be achieved between the upper and lower polarizers 30 and 18.

To overcome the above-mentioned problem, the multi-domain shown in FIG. 11B is adopted for a LCD device. As shown, there are first and second liquid crystal molecules 10a and 10b arranged opposite to each other. The birefringence of the first liquid crystal molecule 10a involves different values for the first, second, and third position "$a_1$", "$b_1$", and "$c_1$". Whereas, the birefringence of the second liquid crystal molecule 10b involves different values for the fourth, fifth, and sixth position "$a_2$", "$b_2$", and "$c_2$". The first and fourth positions "$a_1$" and "$a_2$" involve the same viewing angle. Because the first and second liquid crystal molecules 10a and 10b are symmetrically opposed with each other, a birefringence of the first liquid crystal molecule 10a at the first position "$a_1$" is compensated by that of the second liquid crystal molecule 10b at the fourth position "$b_2$". That is to say, each birefringence of the first liquid crystal molecule 10a is compensated by corresponding birefringence of the second liquid crystal molecule 10b. In other words, sum of the birefringence between the first and second liquid crystal molecules 10a and 10b is about zero. Accordingly, the multi-domain shown in FIG. 11B improves the display quality of the LCD device.

SUMMARY OF THE INVENTION

Accordingly, the present invention is directed to an IPS-LCD device that substantially obviates one or more of the problems due to limitations and disadvantages of the related art.

An object of the present invention is to provide an IPS-LCD device having low color dispersion and low white inversion with respect to viewing angles.

Another object of the present invention is to provide an IPS-LCD device having optimized common and pixel electrodes such that high aperture ratio, low color shift, and fast response time are achieved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve the above object, the first preferred embodiment of the present invention provides an array substrate for an IPS-LCD device. The array substrate includes: a substrate; a gate line on the substrate; a data line perpendicular to the gate line; a thin film transistor at a crossing portion between the gate and data lines; a common line parallel to the gate line; a plurality of common electrodes perpendicular to the common line, wherein the common electrodes are spaced apart from each other and at least one of the common electrodes is divided into first and second portions that are co-linear and separated by a predetermined distance; and a plurality of pixel electrodes parallel to the plurality of common electrodes, wherein the plurality of pixel and common electrodes are alternately arranged such that the array substrate is used for the IPS-LCD device.

The first and second portions of the common electrode are about equal in length such that first and second domains for a liquid crystal are produced by the array substrate. Beneficially, the pixel electrode adjacent the first and second portions of the common electrode includes a male electrode opposing a boundary between the first and second portions of the common electrode.

At least one of the pixel electrodes is divided into first and second portions that are co-linear and spaced apart by a predetermined distance. The second portions of the common and pixel electrodes are about twice as long as the first portions of, respectively, the common and pixel electrodes, the first portion of the common electrode opposes the second portion of the pixel electrode, and the second portion of the common electrode opposes the first portion of the pixel electrode. Beneficially, the common electrode adjacent the pixel electrode includes a male electrode that opposes a boundary between the first and second portions of the pixel electrode. In addition, the pixel electrode adjacent the common electrode beneficially includes a male electrode that opposes a boundary between the first and second portions of the common electrode.

The pixel electrode is selected from a group consisting of indium tin oxide (ITO) and indium zinc oxide (IZO). The common electrode is selected from a group consisting of chromium (Cr), aluminum (Al), aluminum alloy (Al alloy), molybdenum (Mo), tantalum (Ta), tungsten (W), antimony (Sb), and an alloy thereof, or is beneficially selected from a group consisting of indium tin oxide (ITO) and indium zinc oxide (IZO).

In another aspect, the present invention provides an array substrate for an IPS-LCD device. The array substrate includes: a substrate; a gate line on the substrate; a data line perpendicular to the gate line; a thin film transistor at a crossing portion between the gate and data lines; a main common line parallel to the gate line; first and second auxiliary common lines perpendicular to the main common line, the first and second auxiliary common lines being parallel to and spaced apart from each other; a plurality of common electrodes perpendicular to the first and second auxiliary common lines, wherein the common electrodes being spaced apart from each other and at least one of the common electrodes is divided into first and second portions that are co-linear and separated by a predetermined distance; and a plurality of pixel electrodes parallel to the plurality of common electrodes, wherein the plurality of pixel and common electrodes are alternately arranged such that the array substrate is used for the IPS-LCD device.

The first and second portions are about equal in length such that first and second domains for a liquid crystal are produced by the array substrate. Beneficially, the pixel electrode adjacent the first and second portions of the common electrode includes a male electrode that opposes an boundary between the first and second portions.

At least one of the pixel electrodes is divided into first and second portions that are co-linear and separated by a predetermined distance. The second portions of the common and pixel electrodes are about twice as long as the first portions of, respectively, the common and pixel electrodes, the first portion of the common electrode opposes the second portion of the pixel electrode, and the second portion of the common electrode opposes the first portion of the pixel electrode.

The common electrode adjacent the pixel electrode includes a male electrode that opposes a boundary between the first and second portions of the pixel electrode. The pixel electrode adjacent the common electrode includes a male electrode that opposes a boundary between the first and second portions of the common electrode.

In another aspect, the present invention provides an array substrate for an IPS-LCD device. The array substrate includes: a substrate; a gate line on the substrate; a data line perpendicular to the gate line; a thin film transistor at a crossing portion between the gate and data lines; a common line parallel to the gate line; a plurality of common electrodes extending perpendicular to the common line; a plurality of pixel electrodes arranged alternately with the plurality of common electrodes; an auxiliary common electrode perpendicularly contacting each of the common electrodes; and an auxiliary pixel electrode perpendicularly contacting each of the pixel electrodes, wherein the auxiliary pixel electrodes is spaced apart from the auxiliary common electrode and wherein the plurality of common electrodes and the plurality of pixel electrodes are on a same layer.

In another aspect, the present invention provides an array substrate for an IPS-LCD device. The array substrate includes: a substrate; a gate line on the substrate; a data line perpendicular to the gate line; a thin film transistor at a crossing portion between the gate and data lines; a common line parallel to the gate line, the common line including first and second auxiliary common lines perpendicular to the common line; a plurality of common electrodes extending perpendicular to the first and second auxiliary common lines; a plurality of pixel electrodes arranged alternately with the plurality of common electrodes; an auxiliary common electrode perpendicularly contacting each of the common electrodes; and an auxiliary pixel electrode perpendicularly contacting each of the pixel electrodes, wherein the auxiliary pixel electrodes is spaced apart from the auxiliary common electrode.

In another aspect, the present invention provides an array substrate for an IPS-LCD device. The array substrate includes; a substrate; a gate line on the substrate; a data line perpendicular to the gate line; a thin film transistor at a crossing portion between the gate and data lines; a common line parallel to the gate line, the common line including a plurality of common electrodes extending perpendicular to the common line; a plurality of pixel electrodes arranged alternately with the plurality of common electrodes; a plurality of auxiliary electrodes connecting the plurality of common and pixel electrodes in a check pattern.

In another aspect, the present invention provides an array substrate for an IPS-LCD device. The array substrate includes; a substrate; a gate line on the substrate; a data line perpendicular to the gate line; a thin film transistor at a crossing portion between the gate and data lines; a pixel region surrounded by the gate and data lines, the pixel region including first and second domains; a transparent pixel electrode including (a) first and second perpendicular pixel electrodes, (b) a plurality of first transverse pixel electrodes, and (c) a second transverse pixel electrode, wherein the first perpendicular pixel electrode is disposed along the first and second domains and perpendicular to the gate line, the second perpendicular pixel electrode is disposed on the second domain and parallel to the first perpendicular pixel electrode, the plurality of first transverse pixel electrodes perpendicularly extends from the first perpendicular pixel electrode on the first domain, and the second transverse pixel electrode connects the first and second perpendicular pixel electrodes on the second domain; a common line parallel to the gate line; and a common electrode including (a) first to third perpendicular common electrodes, (b) a plurality of first transverse common electrodes, and (c) a second transverse common electrode, wherein the first and second perpendicular common electrode is disposed along the first and second domains and parallel to the first and second perpendicular pixel electrodes, the third perpendicular common electrode is disposed on the second domain and between the first and second perpendicular common electrodes, the plurality of first transverse common electrodes are alternately arranged with the plurality of transverse pixel electrodes on the first domain, and the second transverse common electrode connects the first to third perpendicular common electrodes.

An outermost first transverse pixel electrode overlaps a portion of the gate line. The common electrode is a transparent conductive material.

The array substrate further includes an alignment layer having first and second rubbing directions, which correspond to the first and second domains, respectively.

In another aspect, the present invention provides a method for fabricating an array substrate of an IPS-LCD device. The method includes: preparing a substrate; forming a gate line including a gate electrode on the substrate; forming a gate-insulating layer on the substrate such that the gate-insulating layer covers the gate line and gate electrode; forming an active layer and ohmic contact layer on the gate-insulating layer, forming a data line including a source electrode, and a drain electrode on the gate-insulating layer; forming a first passivation layer on the gate-insulating layer such that the first passivation layer covers the data line, source electrode, and drain electrode, the gate-insulating layer having a drain contact hole over the drain electrode; forming a pixel electrode on the first passivation layer, the pixel electrode including (a) first and second perpendicular pixel electrodes, (b) a plurality of first transverse pixel electrodes, and (c) a second transverse pixel electrode, wherein the first perpendicular pixel electrode is disposed along the first and second domains and perpendicular to the gate line, the second perpendicular pixel electrode is disposed on the second domain and parallel to the first perpendicular pixel electrode, the plurality of first transverse pixel electrodes perpendicularly extends from the first perpendicular pixel electrode on the first domain, and the second transverse pixel electrode connects the first and second perpendicular pixel electrodes on the second domain;

forming a second passivation layer on the pixel electrode; forming a common lines including a common electrode on the second passivation layer, the common electrode including (a) first to third perpendicular common electrodes, (b) a plurality of first transverse common electrodes, (c) and second transverse common electrode, wherein the first and second perpendicular common electrode is disposed along the first and second domains and parallel to the first and second perpendicular pixel electrodes, the third perpendicular common electrode is disposed on the second domain and between the first and second perpendicular common electrodes, the plurality of first transverse common electrodes are alternately arranged with the plurality of transverse pixel electrodes on the first domain, and the second transverse common electrode connects the first to third perpendicular common electrodes; and forming an alignment layer on the common electrode, the alignment layer having first and second rubbing directions.

The method further includes the step of forming a planar layer on the common electrode before forming the alignment layer.

An outermost first transverse pixel electrode overlaps a portion of the gate line. The common electrode is a transparent conductive material.

The first and second rubbing directions are symmetrical with respect to a line parallel to the gate line.

In another aspect, the present invention provides an array substrate for an LCD-device. The array substrate includes: a substrate; a gate line on the substrate; a data line perpendicular to the gate line; a thin film transistor at a crossing portion between the gate and data lines; a pixel region surrounded by the gate and data lines, the pixel region including first and second domains; transverse pixel and common electrodes disposed on the first domain and parallel to the gate line, the transverse pixel and common electrodes being alternately arranged; perpendicular pixel and common electrodes disposed on the second domain and perpendicular to the transverse pixel and common electrodes, respectively, the perpendicular pixel and common electrodes being alternately arranged; and an alignment layer having first and second rubbing directions, the first and second rubbing directions corresponding to the first and second domains, respectively.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

First Preferred Embodiment

Figure 12:
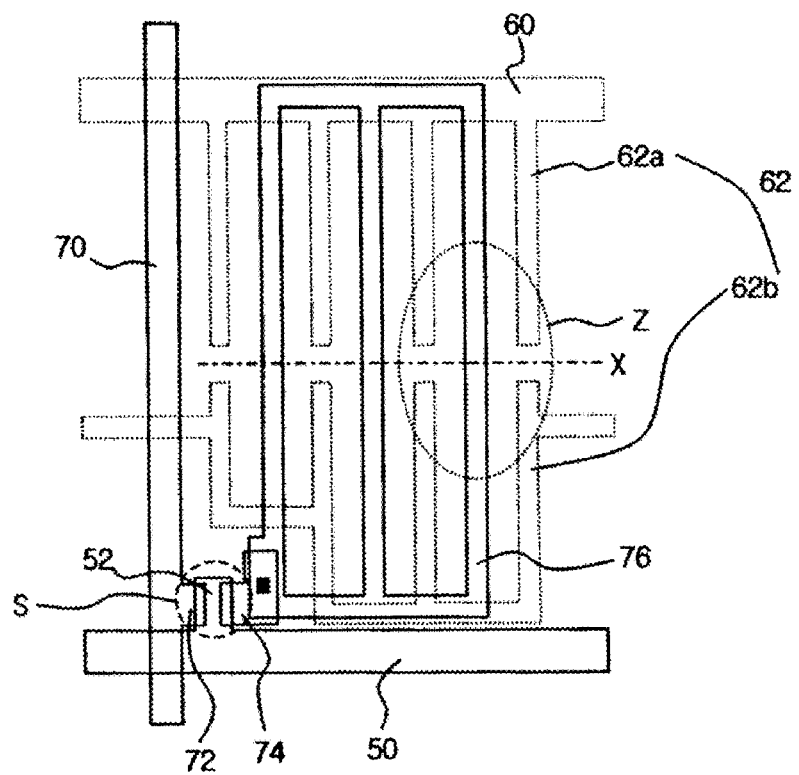
FIG. 12 is a plan view illustrating an IPS-LCD device according to the first preferred embodiment of the present invention.

FIG. 12 is a plan view illustrating a pixel region of an IPS-LCD device according to the first preferred embodiment. As shown, a gate line 50 and a common line 60 are transversely arranged, and a data line 70 is formed perpendicular to the gate and common lines. A plurality of pixel electrodes 76 are formed perpendicular to the gate and common lines 50 and 60. At a crossing point between the gate and data lines 50 and 70, a gate electrode 52 and a source electrode 72 are integrally formed with the gate and data lines 50 and 70, respectively. In addition, a drain electrode 74 is formed spaced apart from the source electrode 72. The gate, source, and drain electrodes 52, 72, and 74 are included in a thin film transistor "S".

Figure 1:
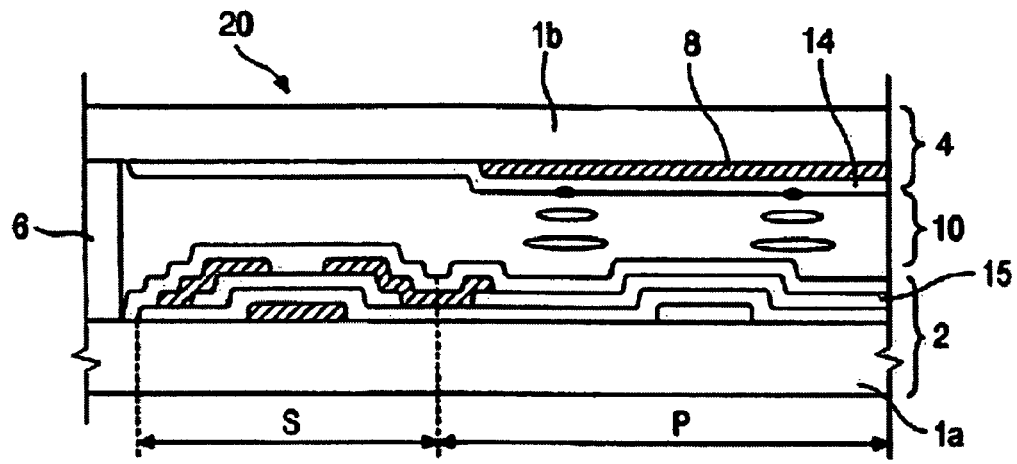
FIG. 1 is a cross-sectional view illustrating a typical liquid crystal display device.
Figure 2A:
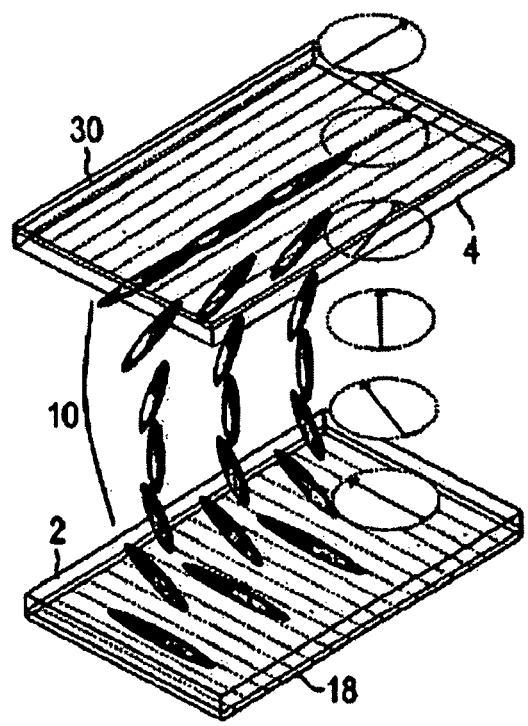
FIGS. 2A and 2B illustrate operation modes of a typical TN-LCD panel.
Figure 2B:
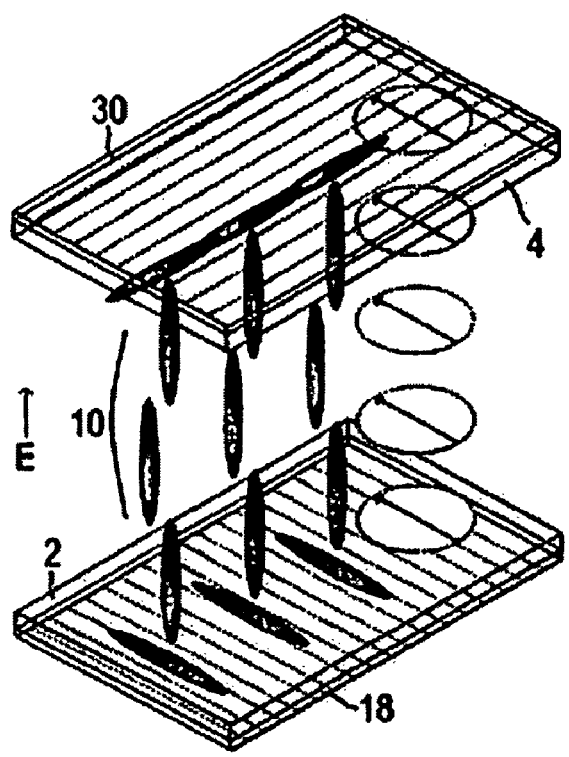
Figure 3:
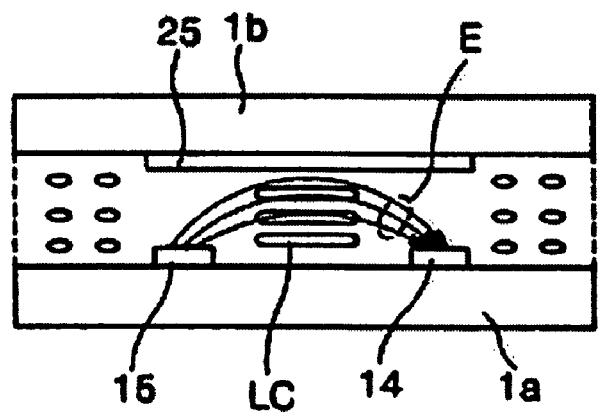
FIG. 3 is a cross-sectional view illustrating a typical IPS-LCD device.
Figure 4A:
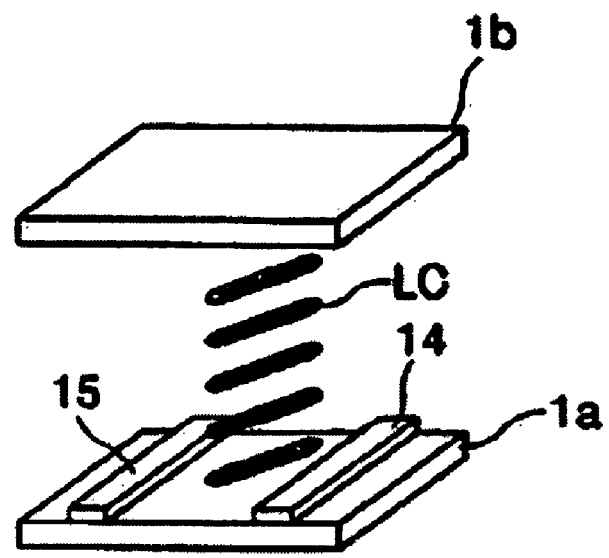
FIGS. 4A and 4B are perspective views illustrating operation modes of the typical IPS-LCD device of FIG. 3.
Figure 4B:
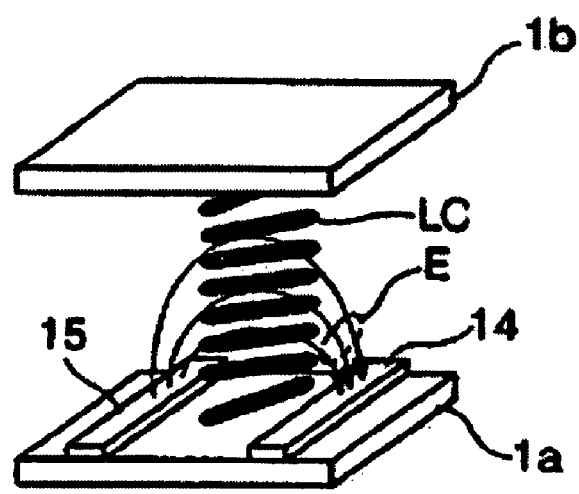
Figure 5A:
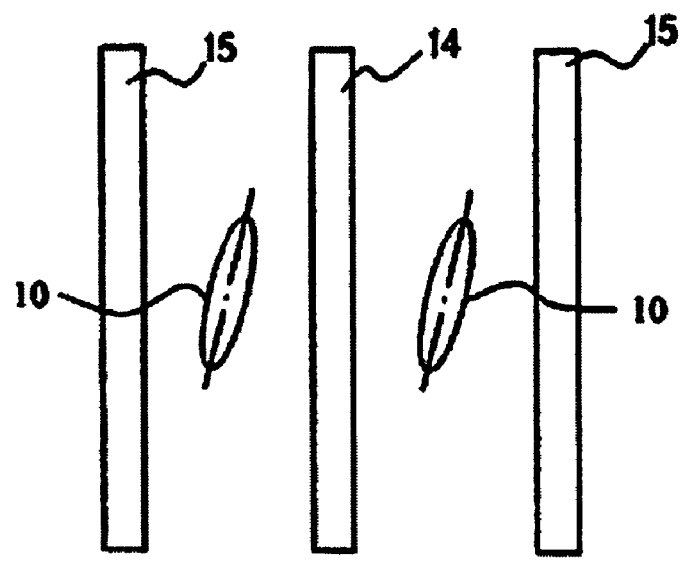
FIGS. 5A and 5B are plan views illustrating, respectively, off state alignment and on state alignment of liquid crystal molecules of the IPS-LCD device shown in FIG. 3.
Figure 5B:
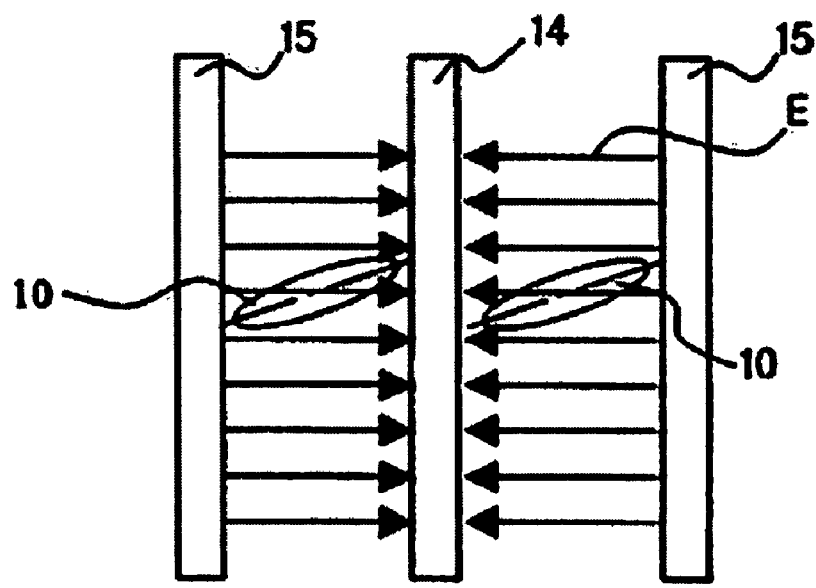
Figure 6:
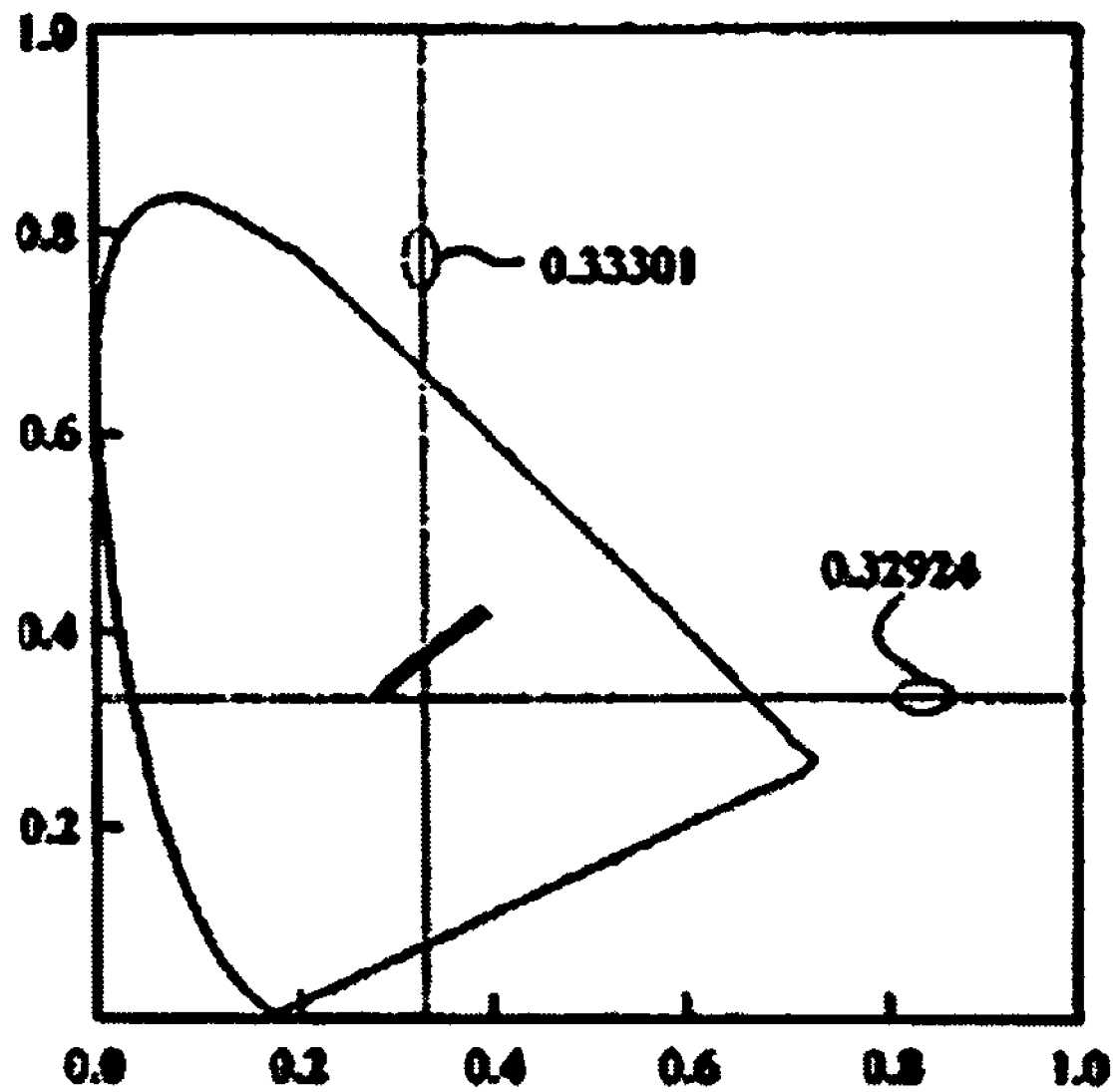
FIG. 6 is a CIE graph illustrating a color coordinate property with respect to various viewing angles of the typical IPS-LCD device.

The common line 60 includes a plurality of common electrodes 62. The common electrodes 62 are perpendicular to the common line 60 and parallel with each other. At this point, each common electrode 62 is cut into first and second portions 62a and 62b, which are co-linear, with a boundary line "X" therebetween. The first and second portions 62a and 62b involve different domains for a liquid crystal layer (reference 10 of FIG. 1), which will be explained in detail with reference to FIG. 13. The common electrodes 62 and pixel electrodes 76 are alternately arranged.

Figure 13:
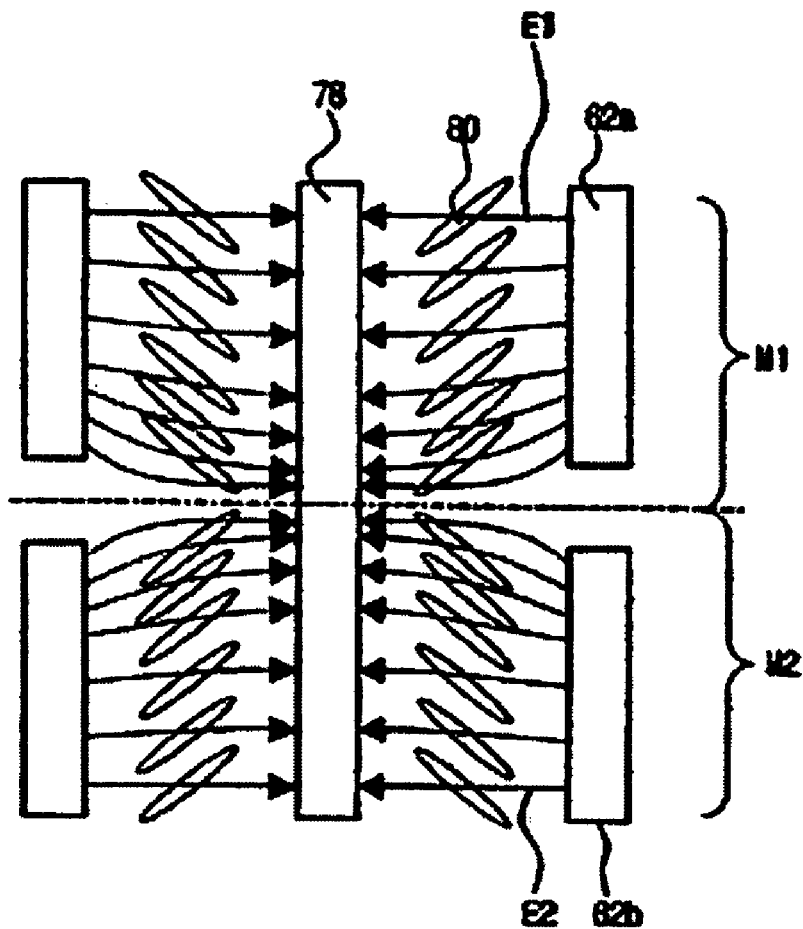
FIG. 13 is an expanded plan view of a portion "Z" of FIG. 12.

FIG. 13 is an expanded plan view of a portion "Z" of FIG. 12. A first domain "M1" and a second domain "M2" for liquid crystal molecules 80 are centered on the boundary line "X" and symmetrically formed. The first domain "M1" is defined by a first electric field "E1" induced between the first portion 62a of the common electrode 62 and the adjacent pixel electrode 76. Whereas, the second domain "M2" is defined by a second electric field "E2" induced between the second portion 62b of the common electrode 62 and the adjacent pixel electrode 76. At this point, each of the first and second electric fields "E1" and "E2" is distorted in opposite directions near the boundary line "X". Then, the liquid crystal molecules 80 are aligned in first and second directions corresponding to the first and second electric fields "E1" and "E2", respectively, such that the first and second domains "M1" and "M2" have opposite alignment directions. The first and second electric fields "E1" and "E2" have a characteristic of a fringe field.

Preferably, the liquid crystal molecules 80 are a positive liquid crystal having positive dielectric anisotropy. In addition, in the off state, long axes of the liquid crystal molecules 80 are preferably aligned parallel to the common and pixel electrodes 62 and 76. That is to say, a rubbing direction of an alignment layer (not shown) for the liquid crystal molecules 80 is preferably parallel to the common and pixel electrodes 62 and 76.

Figure 14:
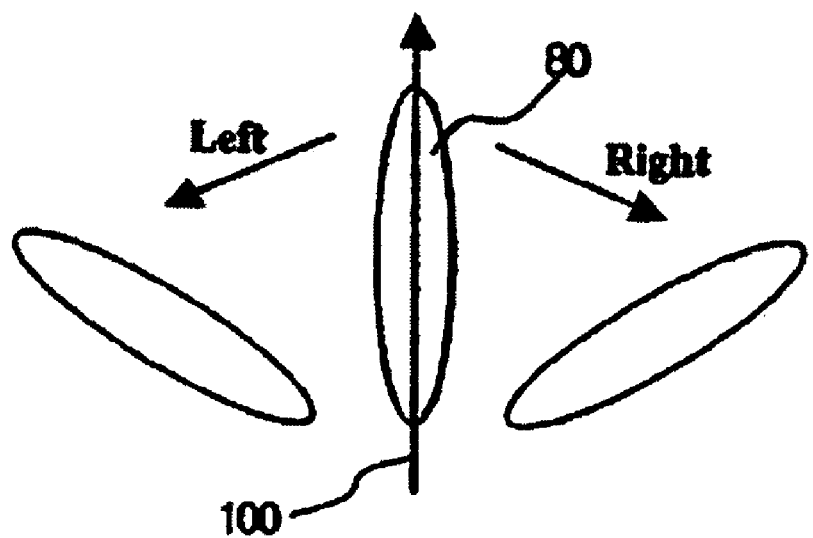
FIG. 14 is a plan view illustrating a degree of freedom for a liquid crystal molecule according to the preferred embodiment.

FIG. 14 shows a degree of freedom for liquid crystal molecule 80 with respect to a rubbing direction 100. In a first state alignment (off state), the liquid crystal molecule 80 is aligned corresponding to the rubbing direction 100, which is preferably parallel to the common and pixel electrodes 62 and 76 of FIG. 12. As shown, the liquid crystal molecule 80 can rotate right or left, which means that the degree of freedom of the liquid crystal molecule 80 is two. Therefore, the first electric field "E1" or second electric fields "E2" of FIG. 13 can cause the liquid crystal molecule 80 to rotate left or right such that the first and second domains "M1" and "M2" are formed.

The liquid crystal molecules 80 may be negative liquid crystal instead of the positive liquid crystal. In that case, the rubbing direction 100 is preferably perpendicular to the common electrodes 62 and pixel electrodes 76.

Figure 7:
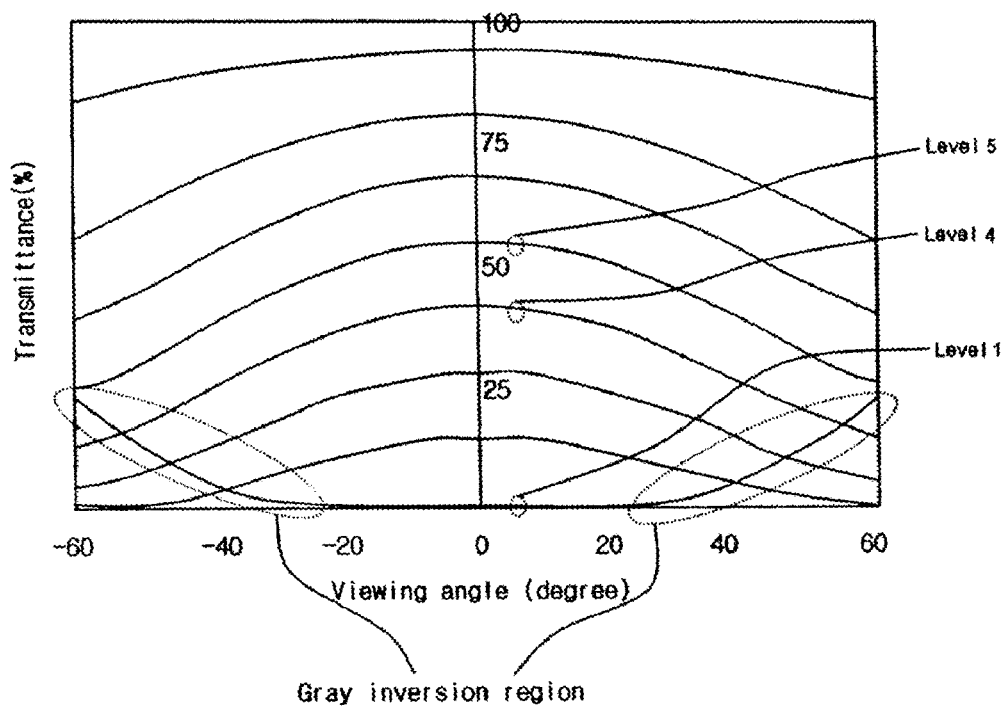
FIG. 7 is a graph illustrating transmittance with respect to viewing angles for first to eighth gray levels of the typical IPS-LCD device.
Figure 8:
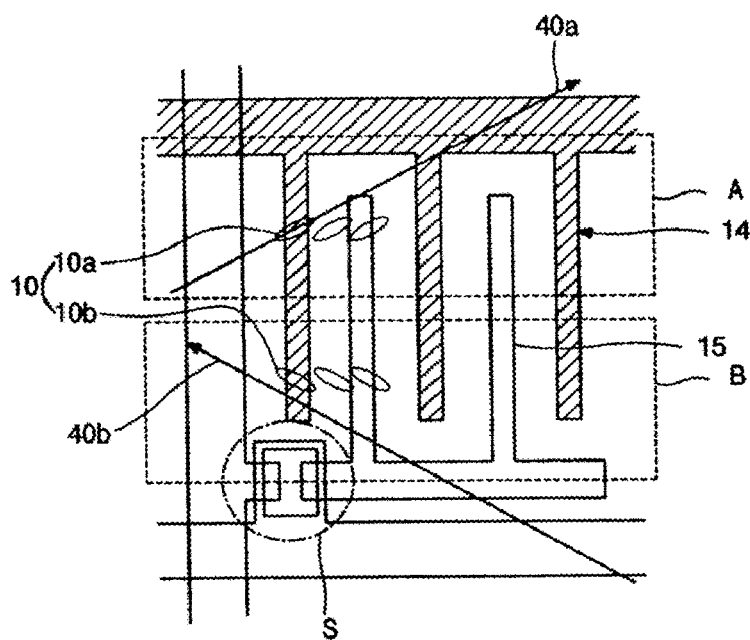
FIG. 8 is a plan view illustrating the first example for an IPS-LCD device according to the related art.
Figure 9A:
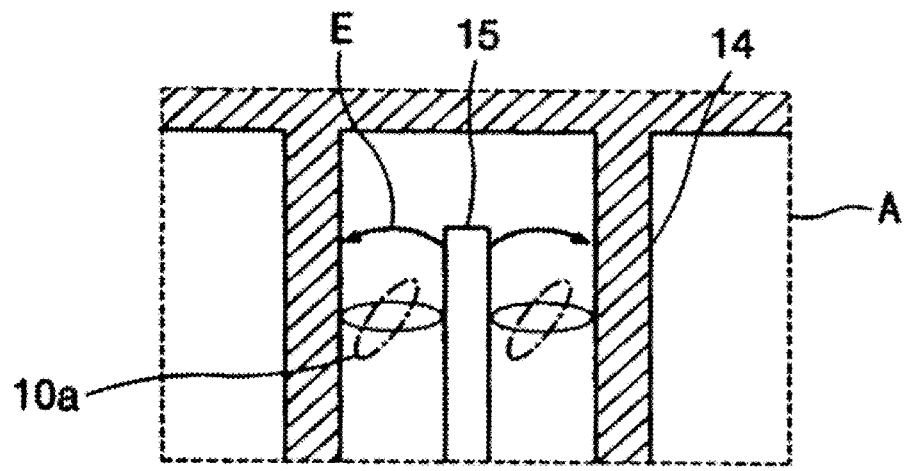
FIGS. 9A and 9B are expanded plan views illustrating, respectively, first and second domains "A" and "B" of FIG. 8.
Figure 9B:
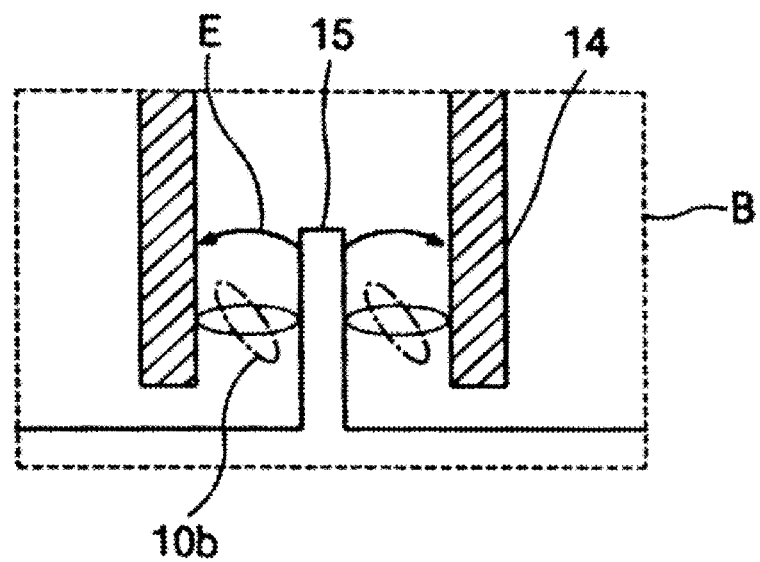

The above-mentioned multi-domain decreases a color's dependence on viewing angles such that a gray inversion shown in FIG. 7 is prevented.

Second Preferred Embodiment

Figure 15:
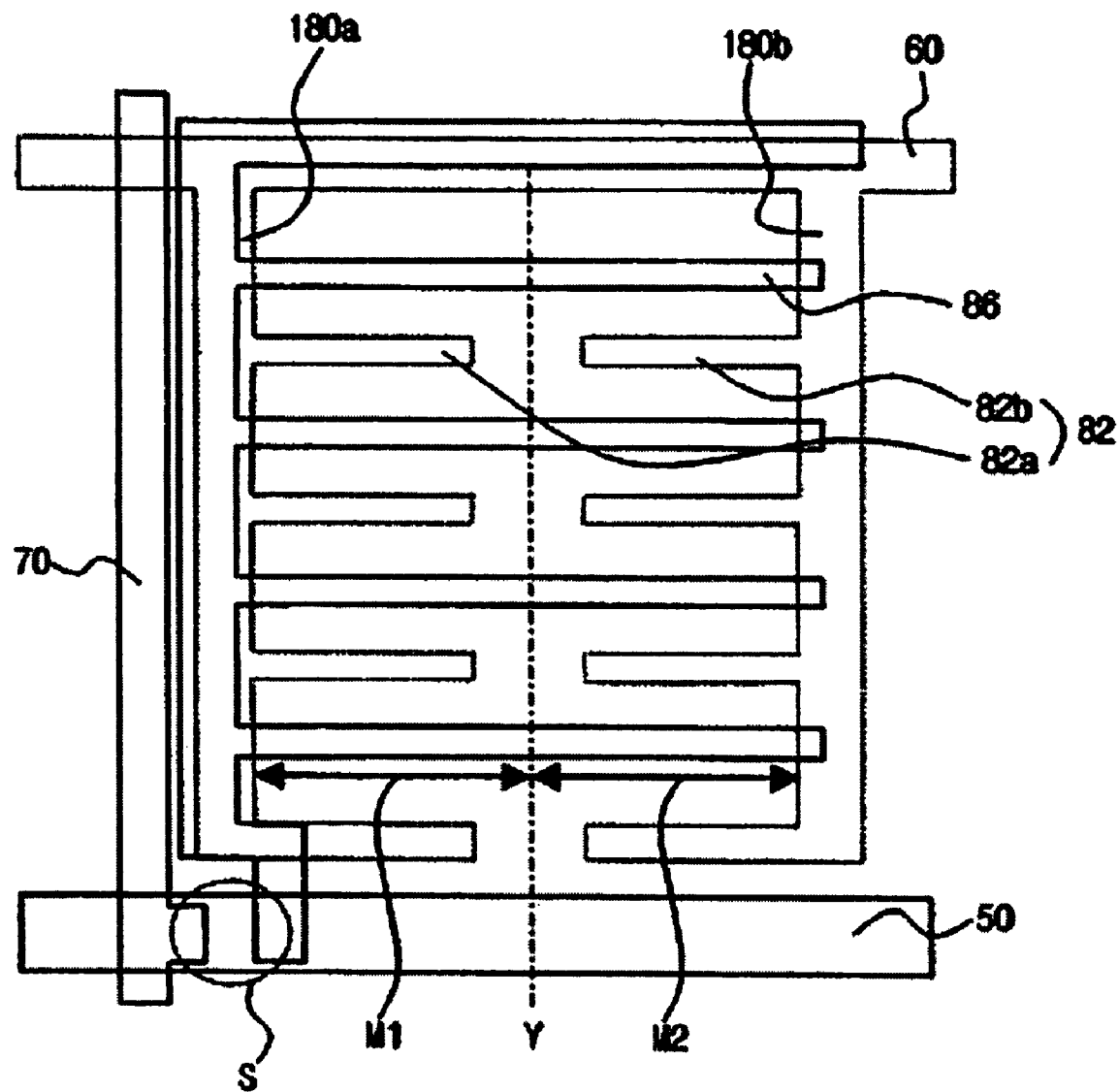
FIG. 15 is a plan view illustrating an IPS-LCD device according to the second preferred embodiment of the present invention.

FIG. 15 is a plan view illustrating a pixel region of an IPS-LCD device according to the second preferred embodiment. As shown, a gate line 50 and a common line 60 are transversely arranged, and a data line 70 is formed perpendicular to the gate and common lines 50 and 60. A plurality of pixel electrodes 86 are formed parallel to the gate and common lines 50 and 60. A thin film transistor "S" is disposed at a crossing point between the gate and data lines 50 and 70.

The common line 60 has first and second auxiliary common lines 181a and 181b, which are perpendicular to the common line 60 and spaced apart from each other. In addition, a plurality of common electrodes 82 are formed perpendicular to the first and second auxiliary common lines 181a and 181b. The common electrodes 82 and pixel electrodes 86 are alternately arranged. At this point, each common electrode 82 is cut into first and second portions 82a and 82b, which are co-linear, with a boundary line "Y" centered on therebetween.

Compared with the first preferred embodiment shown in FIG. 14, the second preferred embodiment adopts the common and pixel electrodes 82 and 86 that are parallel to the common and gate lines 60 and 50, instead of being perpendicular thereto. Therefore, first and second domains "M1" and "M2" are symmetrically formed on the left and right of the boundary line "Y". Since the first and second domains "M1" and "M2" have the same characteristic as shown in FIG. 13, additional description is omitted.

A positive liquid crystal (reference 80 of FIG. 13) is preferably used with a rubbing direction that is parallel to the common and pixel electrodes 82 and 86. If a negative liquid crystal is used for the second preferred embodiment, a rubbing direction that is perpendicular to the common and pixel electrodes 82 and 86 is employed for the second preferred embodiment.

Third Preferred Embodiment

Figure 16:
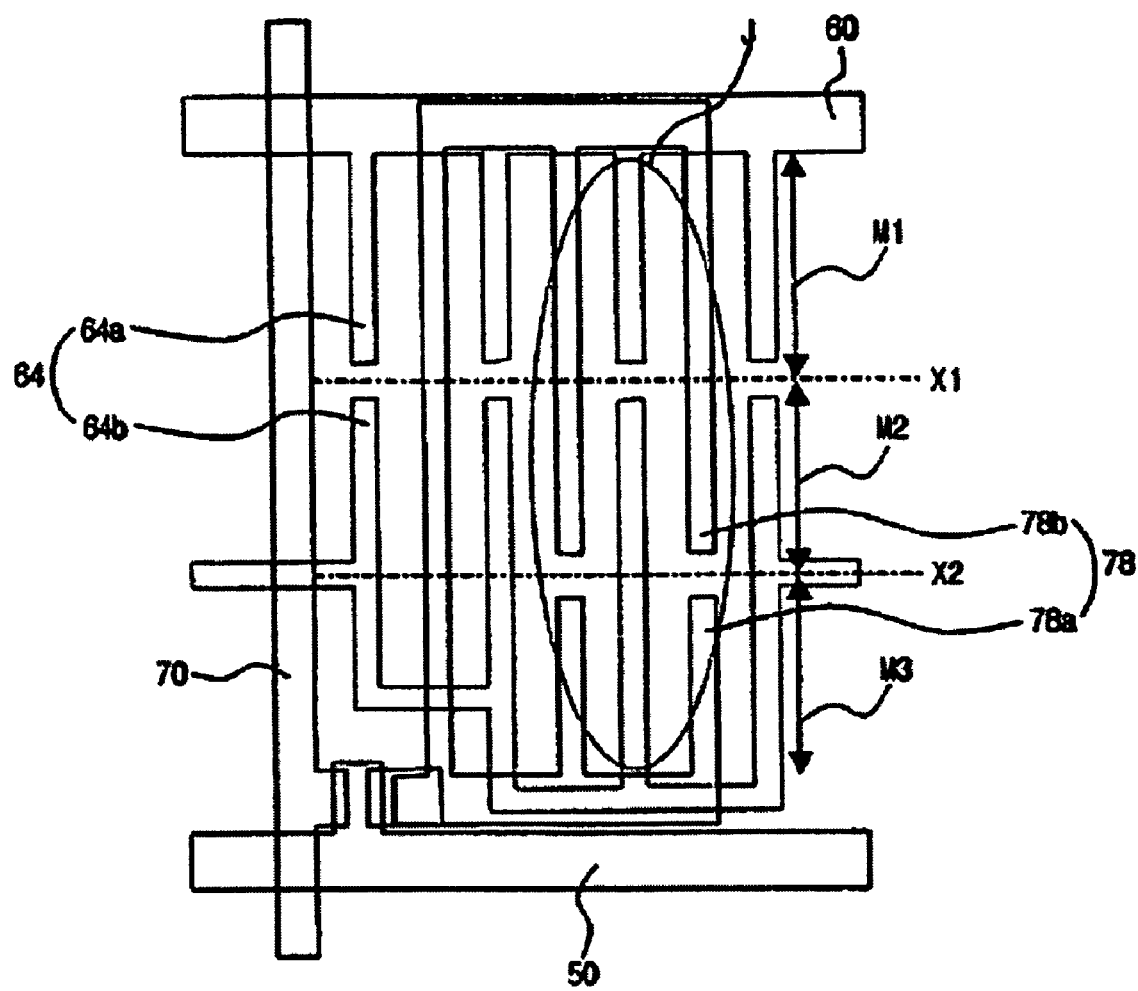
FIG. 16 is a plan view illustrating an IPS-LCD device according to the third preferred embodiment of the present invention.

FIG. 16 is a plan view illustrating a pixel region of an IPS-LCD device according to the third preferred embodiment. Compared with the first preferred embodiment of FIG. 13, the third preferred embodiment provides first, second, and third domains "M1," "M2," and "M3." Except for common and pixel electrodes 64 and 78, all the elements have the same structure as the first preferred embodiment of FIG. 13. The pixel region (reference "P" of FIG. 1) is an area defined by gate and data lines 50 and 70.

As shown in FIG. 16, a common line 60 has a plurality of common electrodes 64, which are spaced apart from each other. Each common electrode 64 is divided into co-linear first and second common sub-electrodes 64a and 64b with a first boundary line "X1" such that the second common sub-electrode 64b is preferably twice as long as the first common sub-electrode 64a. In addition, a plurality of the pixel electrodes 78 are alternately arranged with the common electrodes 64. Each pixel electrode 78 is also divided into co-linear first and second pixel sub-electrodes 78a and 78b with a second boundary line "X2" such that the second pixel sub-electrode 78b is twice as long as the first pixel sub-electrode 78a That is to say, the first and second boundary lines "X1" and "X2" divide the pixel region into the first, second, and third domains "M1," "M2," and "M3."

Figure 17:
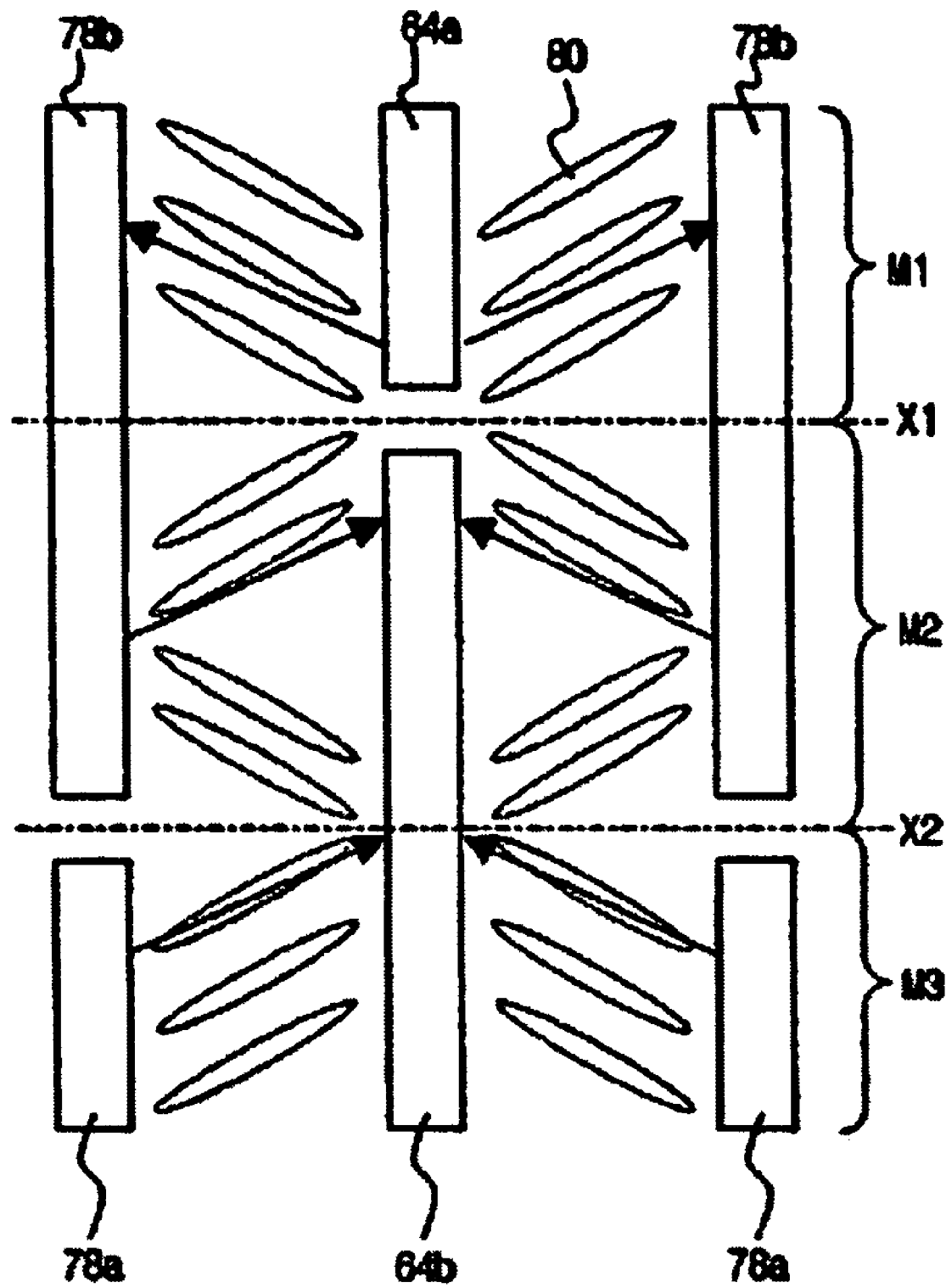
FIG. 17 is an expanded plan view of a portion "J" of FIG. 16.

FIG. 17 is an expanded plan view of a portion "J" of FIG. 16. As shown, each of the first to third domains "M1" to "M3" has a different alignment for liquid crystal molecules 80. Compared with the first preferred embodiment of FIG. 13, each domain of the second preferred embodiment is shorter than that of the first preferred embodiment. At this point, between the common and pixel electrodes 64 and 78, various fringe fields are induced. A fringe field effect is stronger when more domains are present on the same region. That is to say, the second preferred embodiment has the stronger electric field than the first preferred embodiment such that restoring force against an exterior electric impact (electric field or the like) is stronger for the second preferred embodiment. Therefore, the liquid crystal molecules 80 have a faster response time such that they restore to a first state alignment more quickly when the electric field is stopped.

Preferably, the liquid crystal molecules 80 are a positive liquid crystal having positive dielectric anisotropy. In that case, a rubbing direction of an alignment layer (not shown) for the liquid crystal molecules 80 is preferably parallel to the common and pixel electrodes 64 and 78. On the contrary, the liquid crystal molecules 80 may be negative liquid crystal instead of the positive liquid crystal. In that case, the rubbing direction 100 is preferably perpendicular to the common electrodes 62 and pixel electrodes 76.

Fourth Preferred Embodiment

Figure 18:
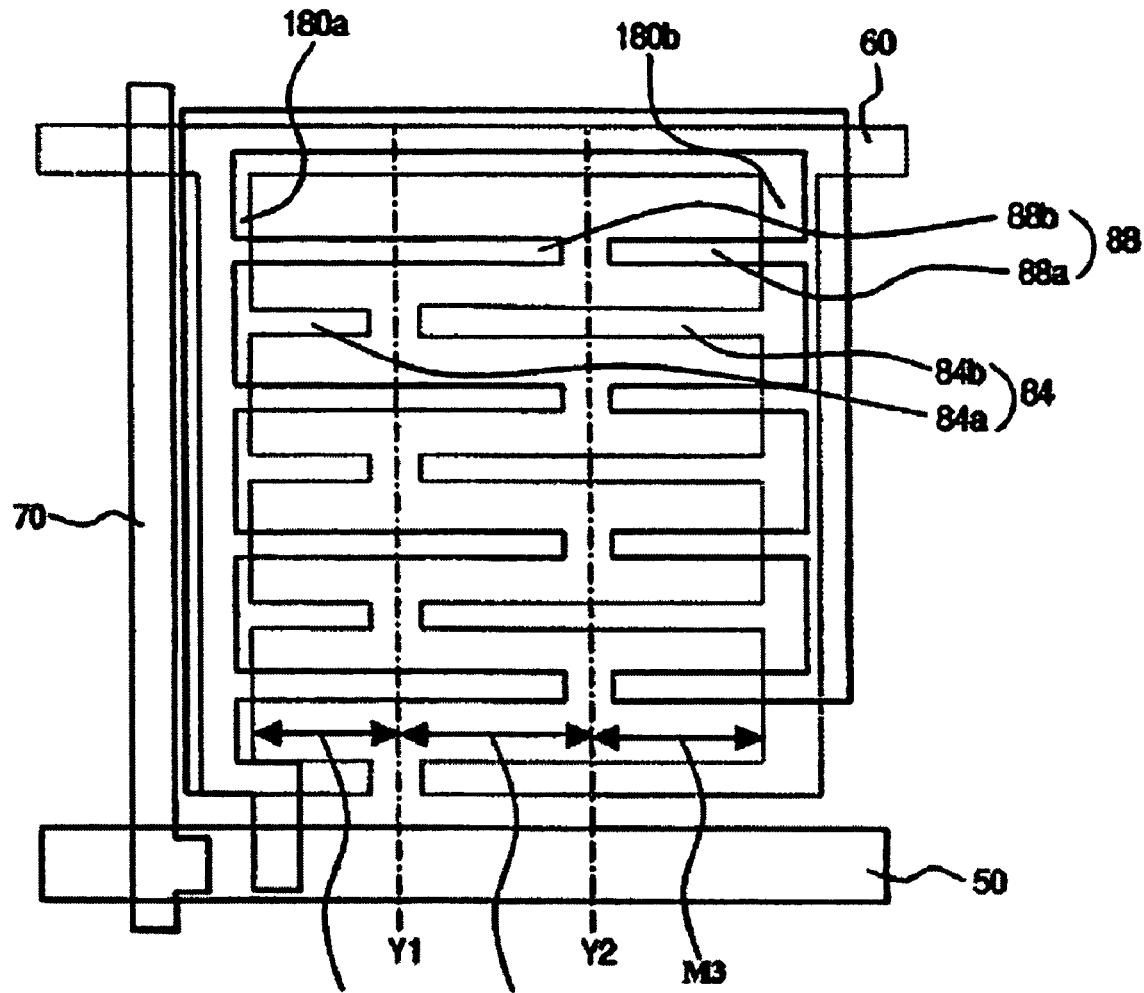
FIG. 18 is a plan view illustrating an IPS-LCD device according to the fourth preferred embodiment of the present invention.

For the fourth preferred embodiment, common and pixel electrodes are formed parallel to the common and gate lines. As shown in FIG. 18, a gate line 50 and a common line 60 are transversely arranged, and a data line 70 is formed perpendicular to the gate and common lines. A plurality of pixel electrodes 88 are formed parallel to the gate and common lines 50 and 60. Each pixel electrode 88 is divided into first and second pixel sub-electrodes 88*a* and 88*b*.

The common line 60 has first and second auxiliary common lines 180*a* and 180*b*, which are perpendicular to the common line 60 and spaced apart from each other. In addition, a plurality of common electrodes 84 are formed perpendicular to the first and second auxiliary common lines 180*a* and 180*b*. The common electrodes 84 and pixel electrodes 88 are alternately arranged. At this point, each common electrode 84 is divided into co-linear first and second common sub-electrodes 84*a* and 84*b* with a first boundary line "Y1" dividing them. The first common sub-electrode 84*a* is preferably half the length of the second common sub-electrode 84*b*. In addition, each pixel electrode 88 is divided into co-linear first and second pixel sub-electrodes 88*a* and 88*b* with a second boundary line "Y2" dividing them. The first pixel sub-electrode 88*a* is preferably half the length of the second pixel sub-electrode 88*b*. That is to say, the fourth preferred embodiment provides first to third domains "M1," "M2," and "M3" like the third preferred embodiment. Because the first to third domains "M1" to "M3" have the same characteristic as shown in FIG. 17 of the third preferred embodiment, additional description is omitted.

A positive liquid crystal (reference 80 of FIG. 17) is preferably used with a rubbing direction that is parallel to the common and pixel electrodes 84 and 88. If a negative liquid crystal is used for the second preferred embodiment, a rubbing direction that is perpendicular to the common and pixel electrodes 84 and 88 is employed for the fourth preferred embodiment.

Fifth Preferred Embodiment

Figure 19:
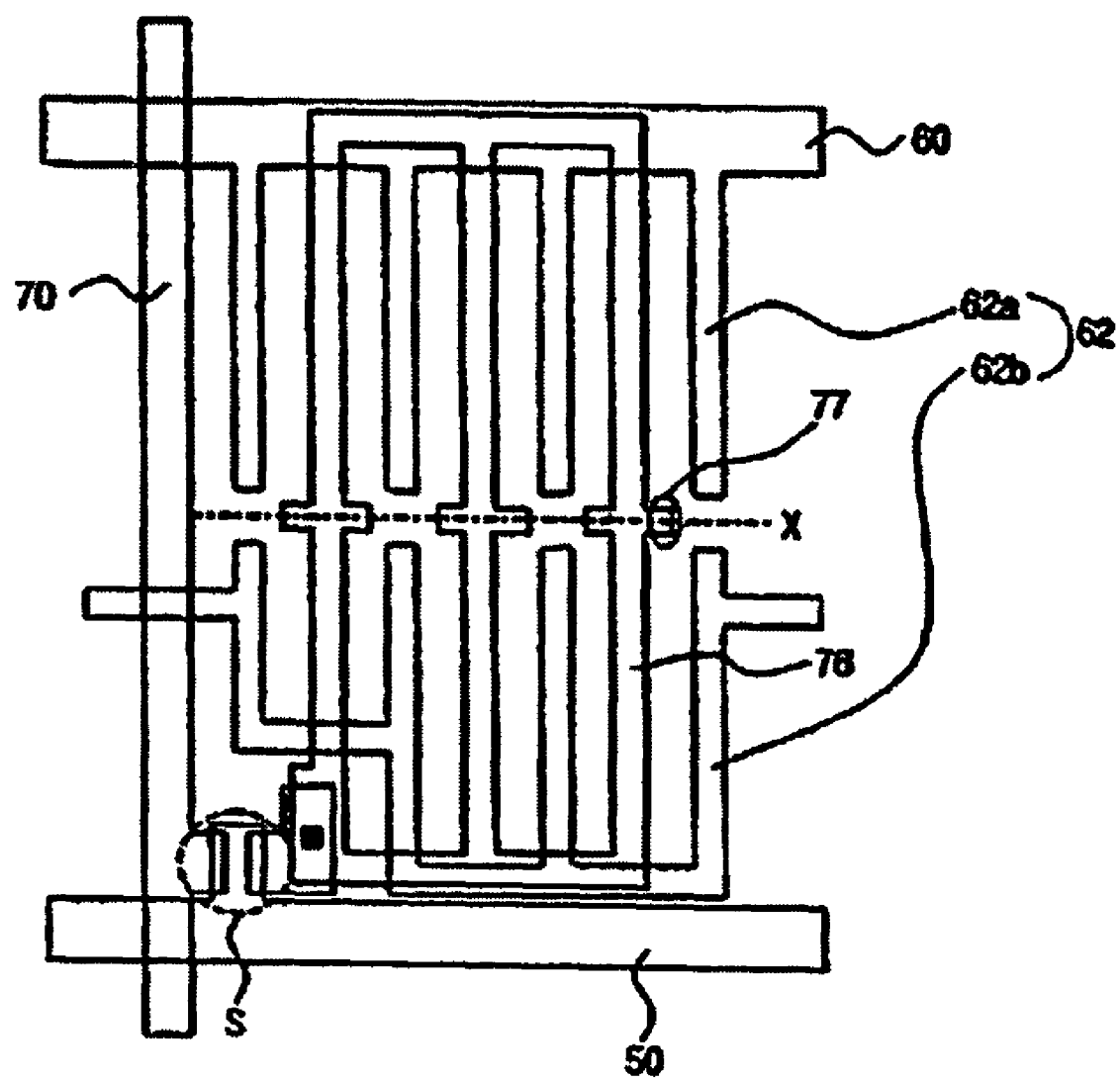
FIGS. 19 and 20 are plan views illustrating modifications of an IPS-LCD device according to the fifth preferred embodiment of the present invention.

FIG. 19 is a plan view illustrating a pixel region of the fifth preferred embodiment. As shown in FIG. 19, except for male electrodes 77 of a pixel electrode 76, the fifth preferred embodiment has the same structure as the first preferred embodiment shown in FIG. 12. A pair of male electrodes 77 of the pixel electrode 76 protrude along a boundary line "X" between first and second co-linear portions 62*a* and 62*b* of a common electrode 62. Each male electrode 77 is perpendicular to the pixel electrode 76.

The male electrodes 77 enhance the distortion of electric fields shown in FIG. 13. In addition, the first and second electric field "E1" and "E2" (see FIG. 13) become stronger around the boundary line "X" because of the male electrodes 77. Therefore, first and second domains "M1" and "M2" shown in FIG. 13 are formed more stably.

Figure 20:
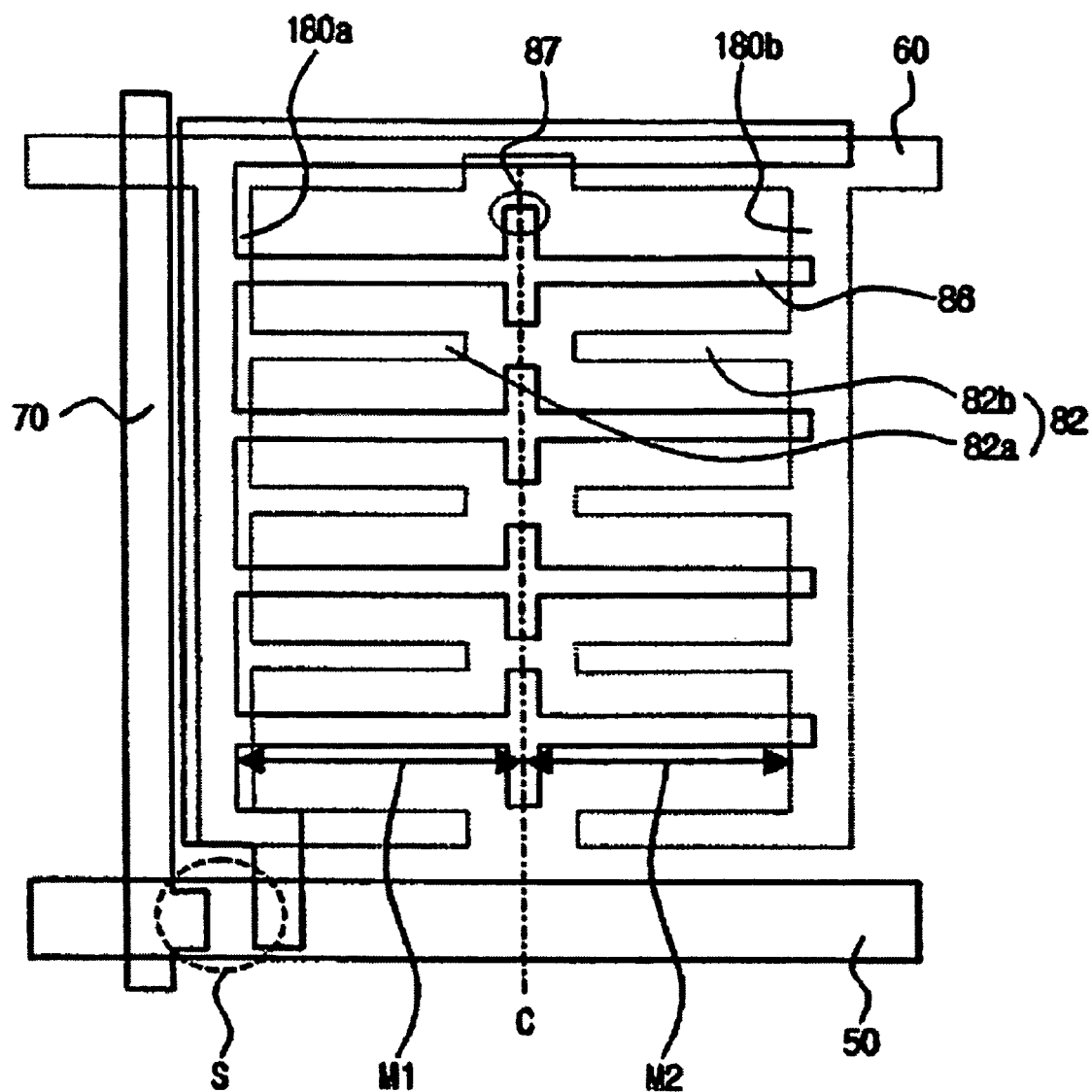

In addition, as shown in FIG. 20, the male electrodes according to the fifth preferred embodiment can be applied to the structure of the second preferred embodiment shown in FIG. 15. Except for male electrodes 87 of a pixel electrode 86, the sixth preferred embodiment has the same structure as the second preferred embodiment shown in FIG. 15. The male electrodes 87 of FIG. 20 have the same role as the male electrodes 77 of FIG. 19.

Sixth Preferred Embodiment

Figure 21:
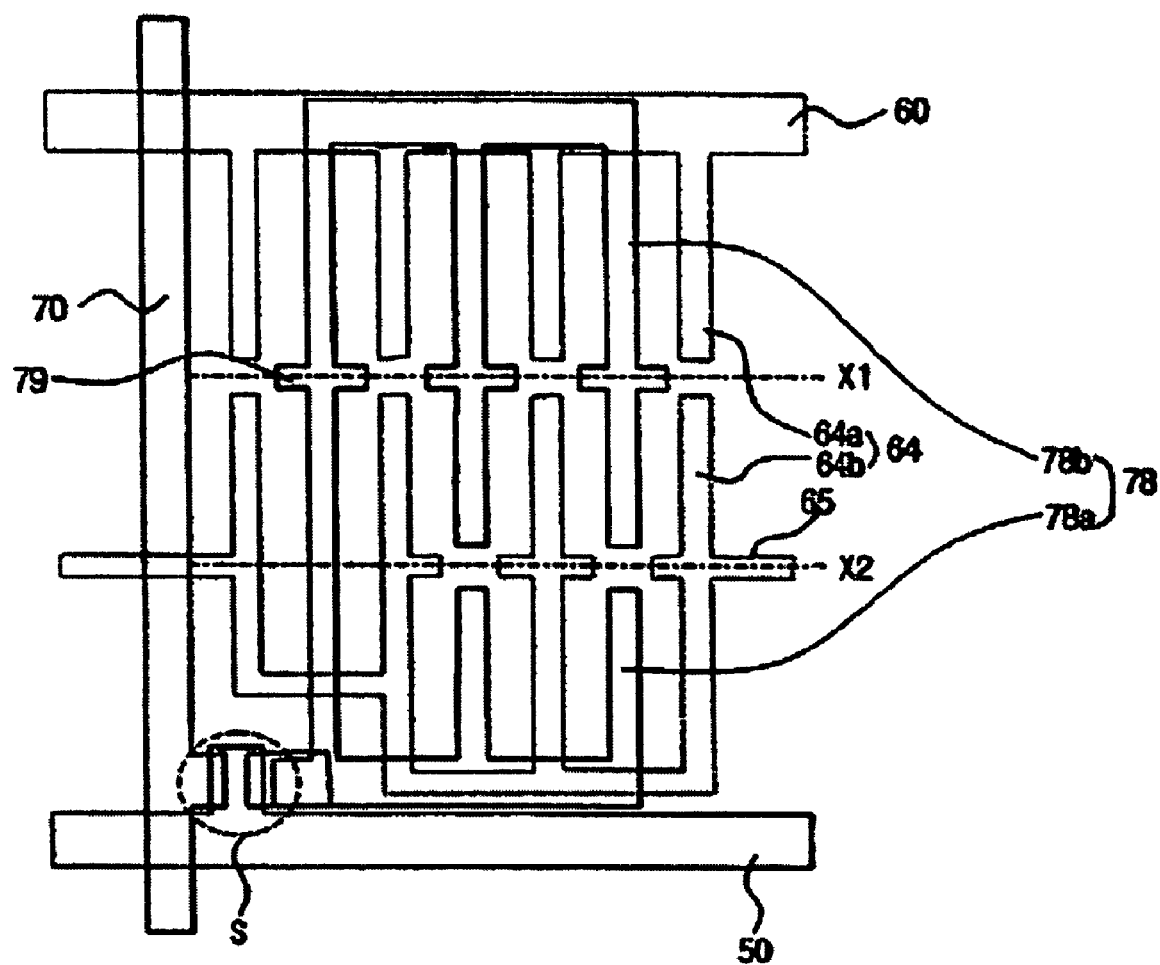
FIGS. 21 and 22 are plan views illustrating modifications of an IPS-LCD device according to the sixth preferred embodiment of the present invention.

FIG. 21 is a plan view illustrating a pixel region of the sixth preferred embodiment. As shown in FIG. 21, except for first and second male electrodes 65 and 79 of common and pixel electrodes 64 and 76, the sixth preferred embodiment has the same structure as the third preferred embodiment shown in FIG. 16. A pair of first male electrodes 65 of the common electrode 64 protrude along a second boundary line "X2," which divides a pixel electrode 78 into first and second pixel sub-electrodes 78*a* and 78*b*. Each first male electrode 65 is perpendicular to the common electrode 64. Whereas, a couple of second male electrodes 79 of the pixel electrode 78 are protruded along a first boundary line "X1," which divides the common electrode 64 into first and second common sub-electrodes 64*a* and 64*b*. Each second male electrode 79 is perpendicular to the pixel electrode 78. The first and second male electrodes 65 and 79 serve the same role as the male electrodes 77 of FIG. 19, that is they enhance the distortion of electric fields.

Figure 22:
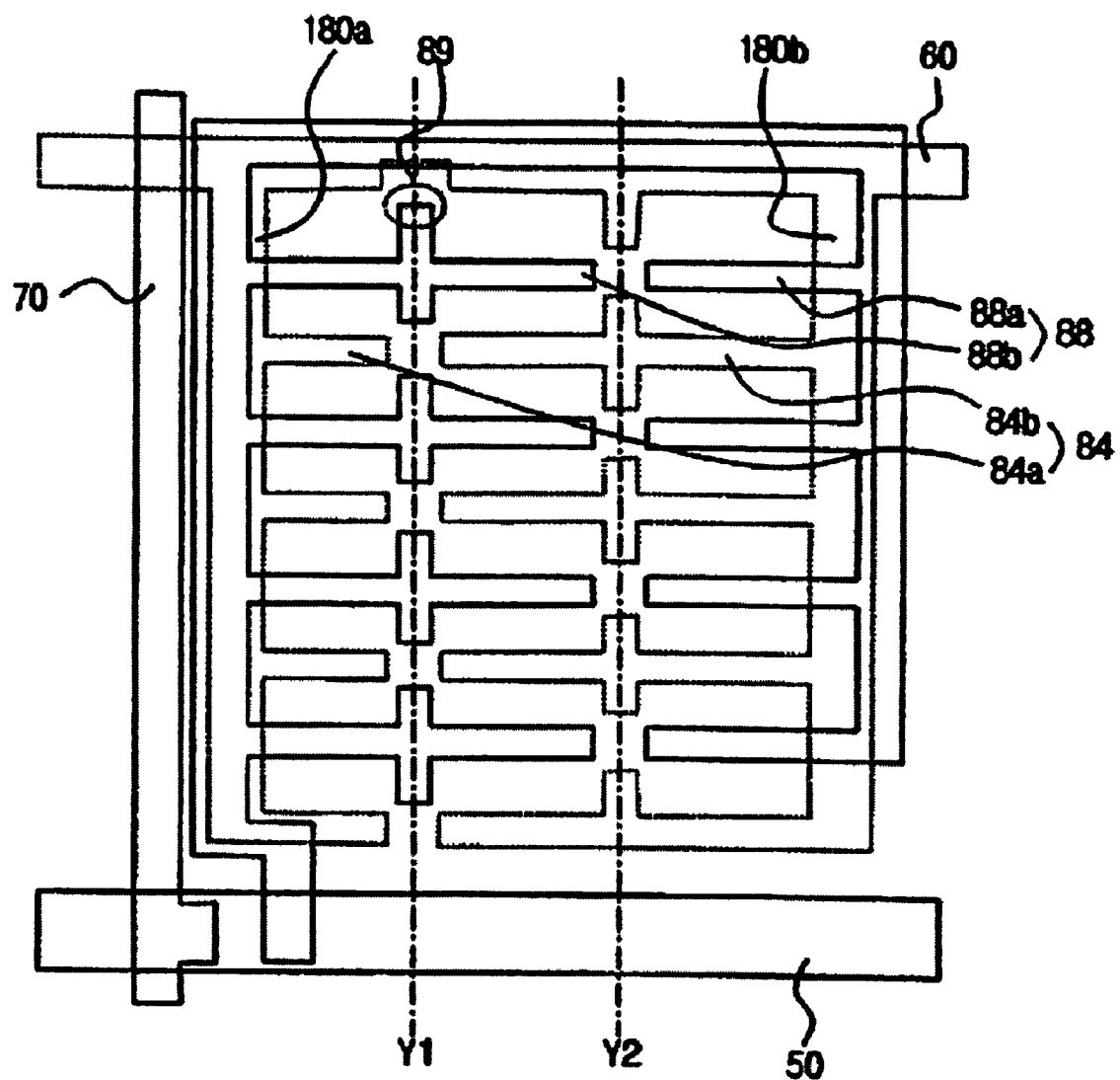

In addition, as shown in FIG. 22, the male electrodes according to the sixth preferred embodiment can be applied to the structure of the fourth preferred embodiment shown in FIG. 18. Except for first and second male electrodes 85 and 89 of pixel and common electrodes 88 and 84, the sixth preferred embodiment has the same structure as the fourth preferred embodiment shown in FIG. 18. The first and second male electrodes 85 and 89 of FIG. 22 have the same role as the first and second male electrodes 65 and 79 of FIG. 21, that is to enhance distortion of electric fields.

Seventh Preferred Embodiment

Figure 23:
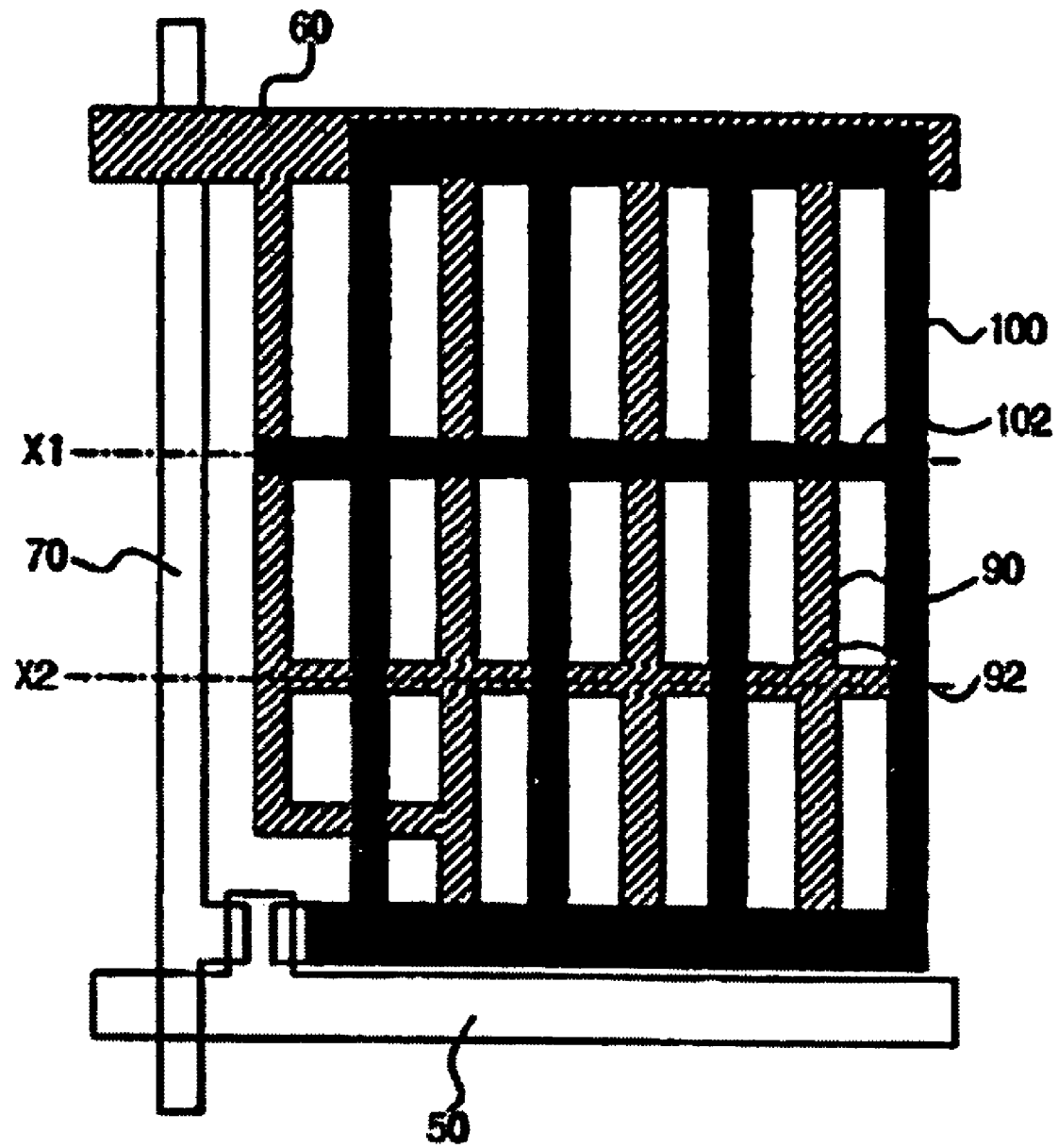
FIG. 23 is a plan view illustrating an IPS-LCD device according to the seventh preferred embodiment of the present invention.

FIG. 23 is a plan view illustrating a pixel region of the seventh preferred embodiment. As shown, a plurality of common and pixel electrodes 90 and 100 are alternately arranged with intervals therebetween. The plurality of common electrodes 90 have an auxiliary common electrode 92, which is formed perpendicular to the common electrodes 90. Whereas, the plurality of pixel electrodes 100 have an auxiliary pixel electrode 102, which is formed perpendicular to the pixel electrodes 100. In other words, the auxiliary common electrode 92 is parallel to a common line 60 and is integrally formed with the plurality of common electrodes 90. In addition, the auxiliary pixel electrode 102 is parallel to the gate electrode 50 and is integrally formed with the plurality of pixel electrodes 100.

Preferably, the auxiliary pixel electrode 102 is disposed along a first boundary line "X1," which sequentially divides the pixel electrodes 100 into one-third and two-third portions. In addition, the auxiliary common electrode 92 is preferably disposed along a second boundary line "X2," which sequentially divides the common electrodes 90 into two-third and one-third portions. That is to say, for the seventh preferred embodiment, first and second male electrodes 65 and 79 of the sixth preferred embodiment shown in FIG. 21 are respectively connected with adjacent ones. Specifically, the first male electrodes 65 (see FIG. 21) are connected to form the auxiliary common electrode 92, whereas the second male electrodes 79 (see FIG. 21) are connected to form the auxiliary pixel electrode 102.

The check pattern-like common and pixel electrodes 90 and 102 improve distortion and strength of electric fields between the common and pixel electrodes 90 and 102 such that a faster response time is achieved. In addition, because a check pattern-like multi-domain is formed on the pixel region, a color dispersion property of the IPS-LCD device is improved. That is to say, liquid crystal molecules are differently aligned for each domain such that the different domains compensate each other to achieve a zero birefringence.

As previously explained, the first to seventh preferred embodiments adopt a multi-domain, where different domains compensate for each other. To achieve the multi-domain, the first to seventh preferred embodiments uses variously distorted electric fields such that liquid crystal molecules are differently aligned in the various domains.

Eighth Preferred Embodiment

Figure 24A:
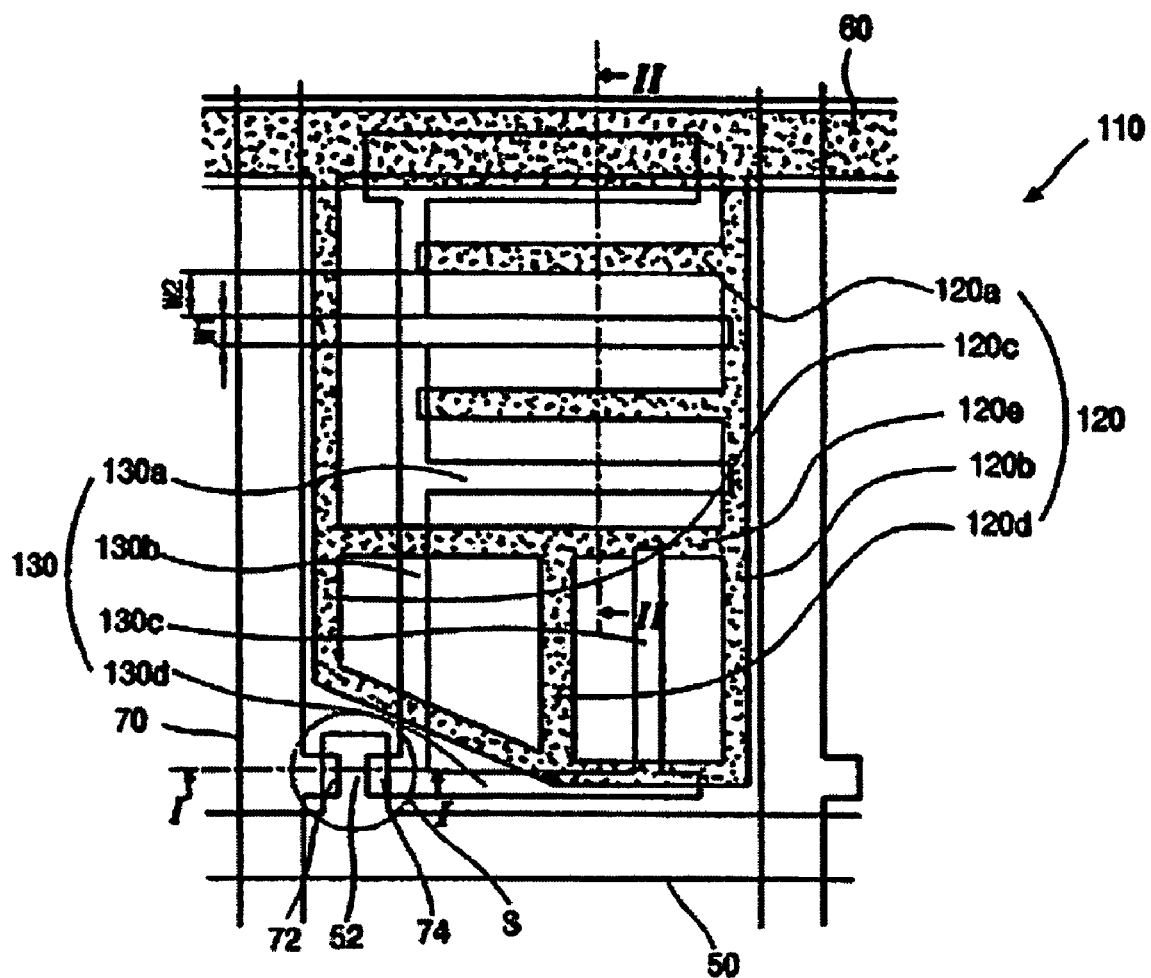
FIG. 24A is a plan view illustrating an IPS-LCD device according to the eighth preferred embodiment of the present invention.

FIG. 24A is a partial expanded plan view illustrating an array substrate 110 for an IPS-LCD device according to the eighth preferred embodiment. As shown, a gate line 50 is transversely formed on the array substrate 110, and a data line 70 is formed perpendicular to the gate line 50. At a crossing point between the gate and data lines 50 and 70, a gate electrode 52 and a source electrode 72 are integrally formed with the gate and data lines 50 and 70, respectively. In addition, a drain electrode 74 is formed spaced apart from the source electrode 72. The gate, source, and drain electrodes 52, 72, and 74 are included in a thin film transistor "S".

On a pixel region defined by the gate and data lines 50 and 70, a common electrode 120 and a pixel electrode 130 are alternately arranged. The common electrode 120 includes a plurality of first transverse common electrodes 120a, first to third perpendicular common electrodes 120b, 120c, and 120d, and second transverse common electrode 120e, all of which are bar-shaped. The plurality of first transverse common electrodes 120a are spaced apart from each other and are parallel to gate line 50, on a first pixel region "P1" (see FIG. 24B). The first and second perpendicular common electrodes 120b and 120c are also spaced apart from each other and are perpendicular to the gate line 50, along the first and second pixel regions "P1" and "P2" (see FIG. 24B). The third perpendicular common electrode 120d is disposed on the second pixel region "P2" (see FIG. 24B) and is parallel to the first and second common electrodes 120b and 120c. The second transverse common electrode 120e is perpendicular to the first and second common electrodes 120b and 120c and connects the first to third perpendicular common electrodes 120b to 120d.

The pixel electrode 130 includes a plurality of first transverse pixel electrodes 130a, first and second perpendicular pixel electrodes 130b and 130c, and second transverse pixel electrode 130d, all of which are preferably bar-shaped. The plurality of first transverse pixel electrodes 130a are spaced apart from each other and are parallel to the first transverse common electrodes 120a. The first and second perpendicular pixel electrodes 130b and 130c are spaced apart from each other and are parallel to the first perpendicular common electrode 120b. The second transverse pixel electrode 130d connects the first and second perpendicular pixel electrodes 130b and 130c on the second pixel region "P2" (see FIG. 24B). The transverse common and pixel electrodes 120a and 130a are alternately arranged with intervals therebetween, whereas the perpendicular common electrode 120b and first and second perpendicular pixel electrodes 130b and 130c are alternately arranged with intervals therebetween. The plurality of transverse pixel electrodes 130a are preferably perpendicular to the first perpendicular pixel electrode 130b and are directly connected therewith.

Figure 24B:
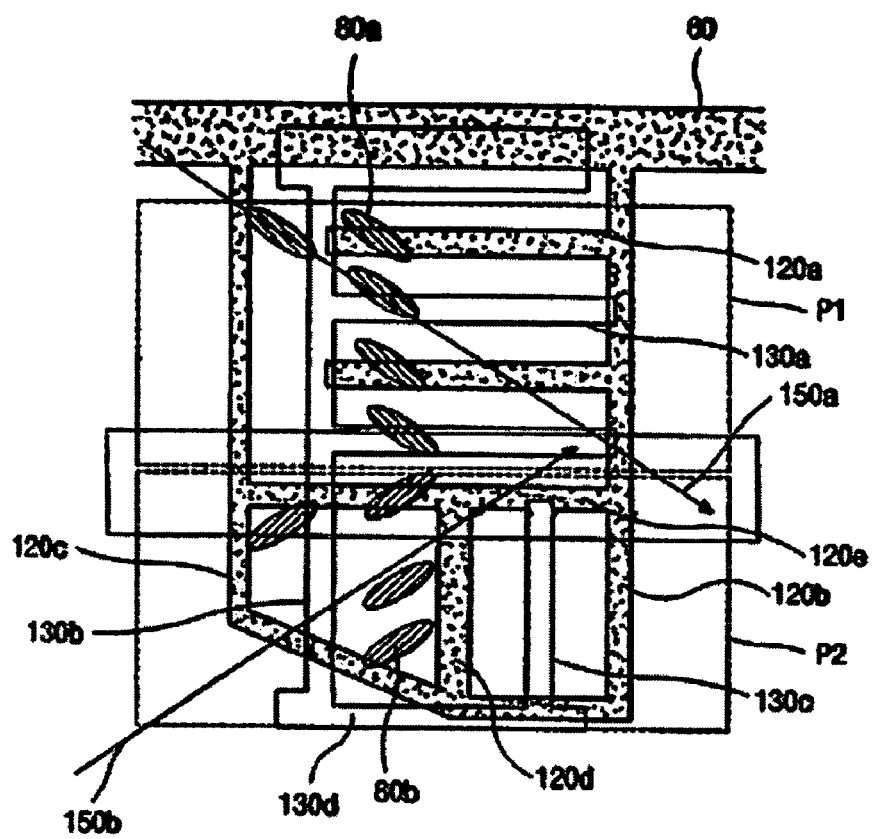
FIG. 24B is a plan view illustrating a principle of the eight preferred embodiment of FIG. 24A.

FIG. 24B shows an alignment characteristic of the above-mentioned array substrate 110. As shown, the pixel region defined by the gate and data lines 50 and 70 is divided into first and second pixel regions "P1" and "P2" depending on the shape of the electrodes thereon. That is to say, the plurality of first transverse common and pixel electrodes 120a and 130a are alternately arranged on the first pixel region. Whereas, the first to third perpendicular common electrodes 120b to 120d are alternately arranged with the first and second perpendicular pixel electrodes 130b and 130c on the second pixel region "P2." The first perpendicular pixel electrode 130b is disposed along the first and second pixel regions "P1" and "P2," while the second perpendicular pixel electrode 130c is disposed only on the second pixel region "P2." Though not shown in FIG. 24A, an alignment layer is formed over the array substrate 110. The alignment layer (not shown) preferably has first and second rubbing directions 150a and 150b, which are formed using different rubbing processes. To form the rubbing direction, a rubbing fabric is preferably used. A photo-alignment layer may be used as the alignment layer. Then, first and second liquid crystal portions 80a and 80b are respectively aligned according to the first and second rubbing directions 150a and 150b.

Figure 10:
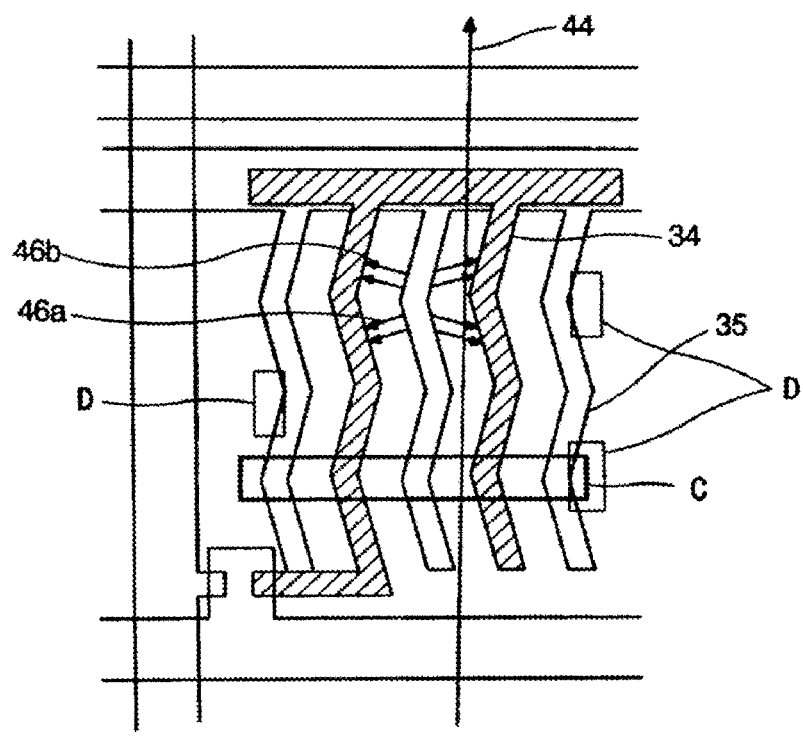
FIG. 10 is a plan view illustrating the second example for an IPS-LCD device according to the related art.
Figure 11A:
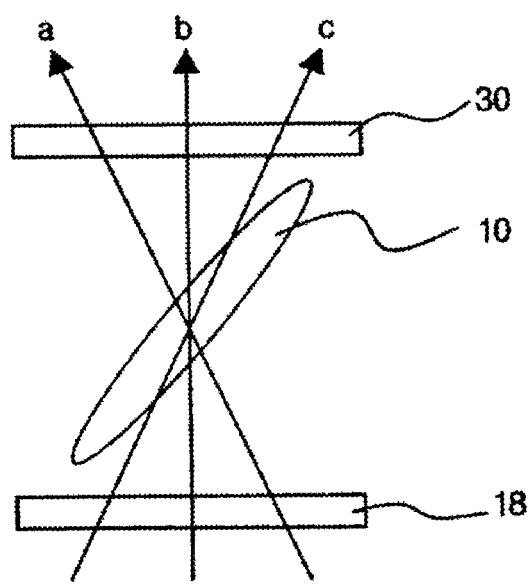
FIGS. 11A and 11B are cross-sectional views illustrating, respectively, single domain and multi-domain for liquid crystal molecules.
Figure 11B:
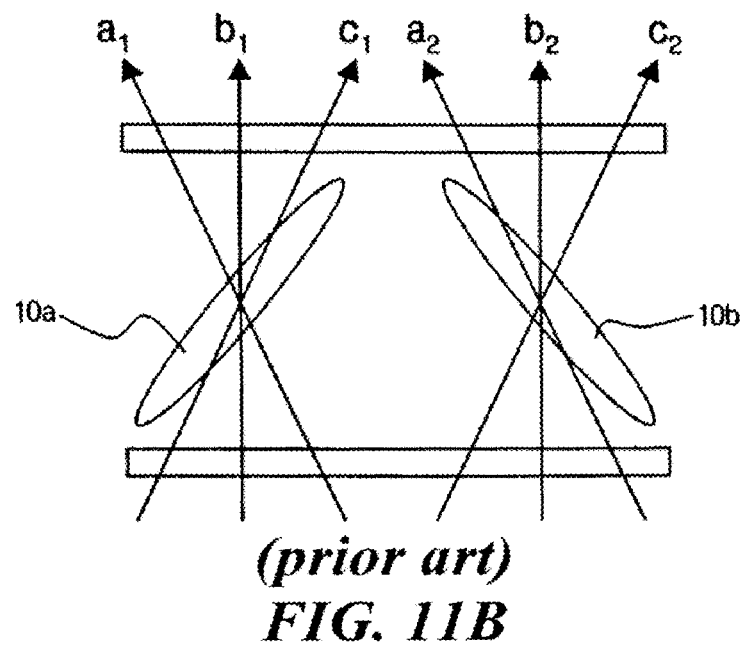

Preferably, the first liquid crystal portion 80a is aligned according to the first rubbing direction 150a such that long axes of molecules of the first liquid crystal portion 80a are at an angle of 45 degrees with respect to the first transverse pixel electrode 130a. In addition, the second liquid crystal portion 80b is aligned according to the second rubbing direction 150b such that long axes of molecules of the second liquid crystal portion 80b are at an angle of 45 degrees with respect to the first transverse pixel electrode 130a. That is to say, the first and second liquid crystal portions 80a and 80b are symmetrically aligned by the first and second rubbing directions 150a and 150b, respectively. The symmetrical first and second pixel regions "P1" and "P2" compensate each other for zero birefringence such that a color shift with respect to wide viewing angles is prevented. In an on state of the IPS-LCD device, all the liquid crystal molecules are aligned perpendicular to the common and pixel electrodes 120 and 130. At this point, because the inventive IPS-LCD device has no bending portion, disclinations of a conventional IPS-LCD device shown in FIG. 10 do not occur.

Returning to FIG. 24A, each of the first transverse common and pixel electrodes 120a and 130a has a width "W1," and adjacent transverse common and pixel electrodes 120a and 130a are spaced apart with an interval "W2" therebetween. For optimized operation of the IPS-LCD device using 5V as a driving voltage, the width "W1" and interval "W2" preferably have a ratio of 5:8 (W1:W2=5:8). Since the above-mentioned optimization for the first pixel region "P1" of FIG. 24B is related to a relatively wider interval between the adjacent gate lines 50, the above-mentioned optimized design is possible. However, optimization for the second pixel region "P2" is more difficult than that of the first pixel region "P1" because of a relatively narrower interval between the adjacent data lines 70.

The pixel electrode 130 is preferably made from a transparent conductive material, usually indium tin oxide (ITO), which has a high transmittance. Meanwhile, the common electrode 120 is usually made of the same material as the gate line 50, but the transparent conductive material is preferably used for the common electrode 120 to achieve a higher aperture ratio.

Now, with reference to FIGS. 25A, 25B, 26A, 26B, 27A and 27B, which are sequential cross-sectional views taken along first and second lines "I-I" and "II-II" of FIG. 24A, a fabricating method for the above-mentioned IPS-LCD device is explained. At this point, the common and pixel electrodes are made of the same transparent conductive material.

Figure 25A:
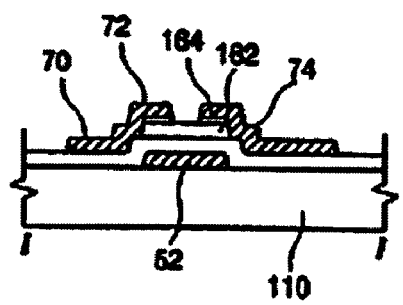
FIGS. 25A, 25B, 26A, 26B, 27A, and 27B are sequential cross-sectional views illustrating a fabricating method for the IPS-LCD device of FIG. 24A.
Figure 25B:
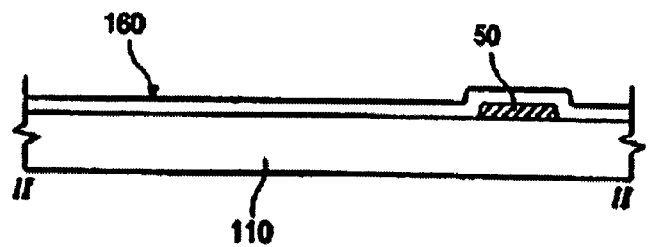

As shown in FIGS. 25A and 25B, the gate line 50 and gate electrode 52 are integrally formed on the array substrate 110. To form the gate line 50 and gate electrode 52, a first metal is deposited on the array substrate 110 and patterned. The first metal is preferably selected from a group consisting of chromium (Cr), aluminum (Al), aluminum alloy (Al alloy), molybdenum (Mo), tantalum (Ta), tungsten (W), antimony (Sb), and an alloy thereof. Then, a gate-insulating layer, or a first insulating layer 160 is formed over the array substrate 110 such that the gate line 50 and gate electrode 52 are covered. The gate-insulating layer is preferably selected from an organic insulating material such as benzocyclobutene (BCB) and acryl resin, or an inorganic insulating material such as silicon dioxide ($SiO_2$) and silicon nitride ($SiN_x$). On the gate-insulating layer 160, an amorphous silicon layer (a–Si:H) and a doped amorphous silicon layer (n+a–Si:H) are sequentially deposited and patterned to form an active layer 162 and an ohmic contact layer 164. The active layer 162 and ohmic contact layer 164 have an island shape. Thereafter, a second metal is deposited over the array substrate 110 and patterned to form the data line 70, source electrode 72, and drain electrode 74. The second metal is preferably the same material as the first metal.

Figure 26A:
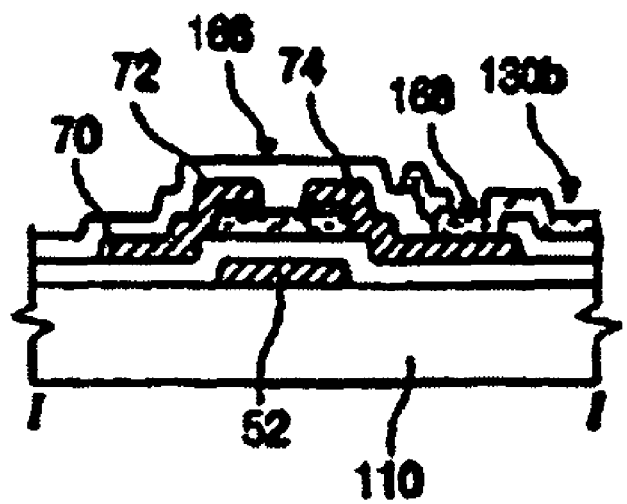
Figure 26B:
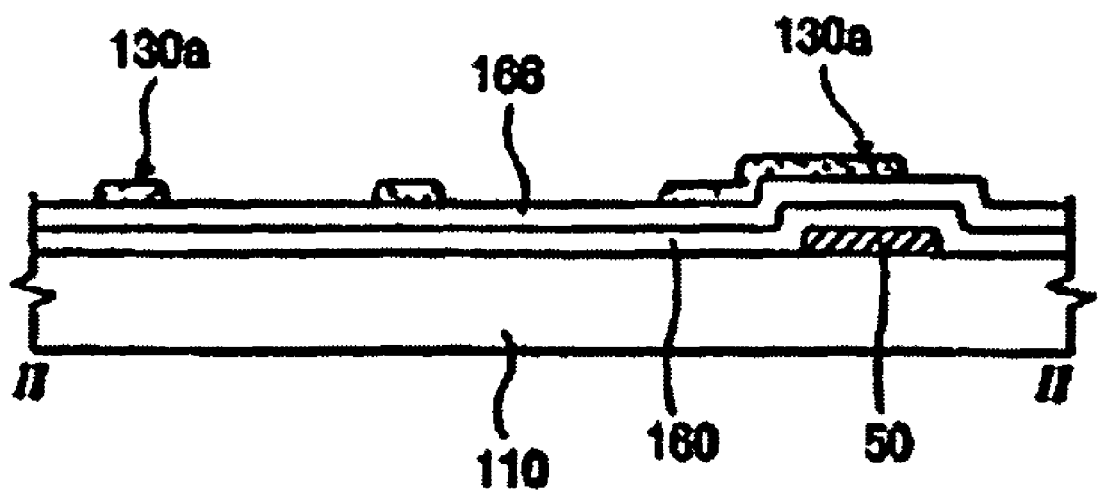

Next, as shown in FIGS. 26A and 26B, the above-mentioned insulating material is deposited over the array substrate 110 such that a first passivation layer, or a second insulating layer 168 is formed on the second metal layer. The first passivation layer 168 is patterned to have a drain contact hole 168, which is disposed over the drain electrode 74. Then, a transparent conductive material is deposited and patterned on the first passivation layer 168 to form the pixel electrode 130 including the transverse pixel electrode 130a and perpendicular pixel electrode 130b. The transparent conductive material is preferably selected from a group consisting of indium tin oxide (ITO) and indium zinc oxide (IZO). At this point, an outermost transverse pixel electrode 130a shown in right of FIG. 26B overlaps a portion of the gate line 50 with the gate-insulating layer 160 and first passivation layer 166 therebetween. The extended portion of the outermost transverse pixel electrode 130a serves as a first electrode of a storage capacitor (reference 280 of FIG. 27B). The pixel electrode 130 has the plurality of transverse pixel electrodes 130a, the first and second perpendicular pixel electrodes 130b and 130c, and the second transverse pixel electrode 130d (see FIG. 24A).

Figure 27A:
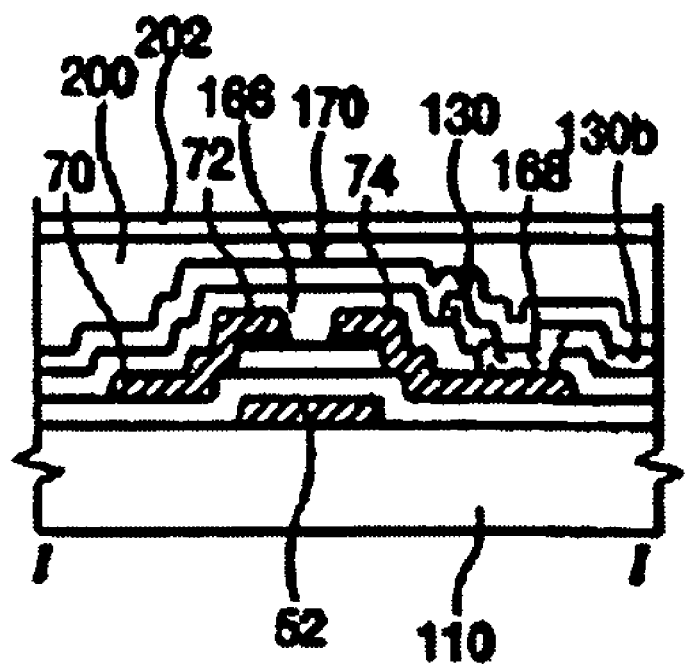
Figure 27B:
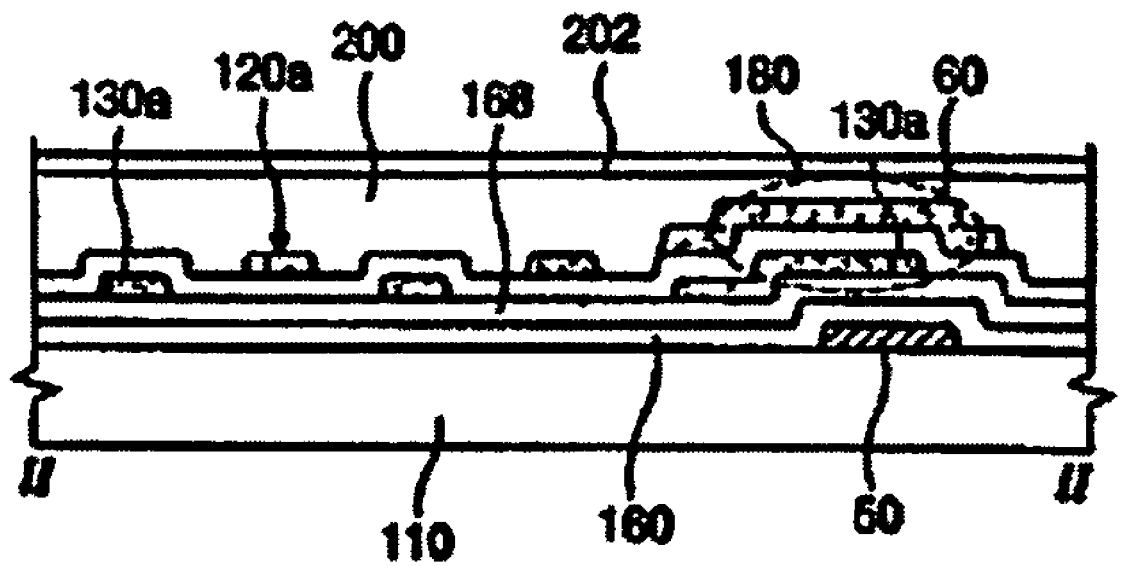

Next, as shown in FIGS. 27A and 27C, the insulating material is deposited and patterned over the array substrate 110 such that a second passivation layer, or a third insulating layer 170 is formed to cover the pixel electrode 130. Then, the transparent conductive material is deposited and patterned on the second passivation layer 170 to form the common electrode 120 and common line 60. The common electrode 120 includes the plurality of first transverse common electrodes 120a, first to third perpendicular common electrodes 120b to 120d, and second transverse common electrode 120e (see FIG. 24A). A portion of the common line 60 serves as a second electrode of the storage capacitor 180. That is to say, portions of the outermost transverse pixel electrode 130a and common line 60 are used as the first and second electrodes for the storage capacitor 280.

Thereafter, a planar layer 200 is formed on the common electrode 130 and common line 60 such that the array substrate 110 has a plane surface. On the planar layer 200, an alignment layer 202 is formed. The alignment layer 202 has the first and second rubbing directions 150a and 150b shown in FIG. 24B. At this point, a sufficiently thick alignment layer may be used. In that case, the alignment layer 202 substitutes for the planar layer 200 such that the planar layer 200 can be omitted.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. An array substrate for an IPS-LCD device, the array substrate comprising:
   a substrate;
   a gate line on the substrate;
   a data line perpendicular to the gate line;
   a thin film transistor at a crossing portion between the gate and data lines;
   a common line parallel to the gate line, the common line including a plurality of common electrodes extending perpendicular to the common line;
   a plurality of pixel electrodes arranged alternately with the plurality of common electrodes;
   a single auxiliary common electrode perpendicular to and integrally formed with the plurality of common electrodes; and
   a single auxiliary pixel electrode perpendicular to and integrally formed with the plurality of pixel electrodes,
   wherein the single auxiliary common electrode, the single auxiliary pixel electrode, the plurality of common electrodes and the plurality of pixel electrodes are disposed in a check pattern,
   wherein the single auxiliary common electrode crosses the plurality of common electrodes and the plurality of pixel electrodes, and the single auxiliary pixel electrode crosses the plurality of pixel electrodes and the plurality of common electrodes,
   wherein the single auxiliary common electrode divides each of the plurality of common electrodes into a two-third portion and a one-third portion, and
   wherein the single auxiliary pixel electrode divides each of the plurality of pixel electrodes into a one-third portion and a two-third portion.

2. The substrate according to claim 1, wherein the single auxiliary common electrode and the single auxiliary pixel electrode are parallel to and spaced apart from each other.

* * * * *